US010185989B2

(12) United States Patent
Ritter et al.

(10) Patent No.: US 10,185,989 B2
(45) Date of Patent: Jan. 22, 2019

(54) DISPLAY/USER INTERFACE FOR TRADING SYSTEM

(75) Inventors: Matthew T. Ritter, Jersey City, NJ (US); Ankur Jain, Jersey City, NJ (US); Jai Chhugani, Belle Mead, NJ (US)

(73) Assignee: Bloomberg L.P., New York, NY (US)

(*) Notice: Subject to any disclaimer, the term of this patent is extended or adjusted under 35 U.S.C. 154(b) by 1629 days.

(21) Appl. No.: 13/020,469

(22) Filed: Feb. 3, 2011

(65) Prior Publication Data

US 2011/0270732 A1 Nov. 3, 2011

Related U.S. Application Data

(60) Provisional application No. 61/301,923, filed on Feb. 5, 2010.

(51) Int. Cl.
*G06Q 40/04* (2012.01)
(52) U.S. Cl.
CPC .................................. *G06Q 40/04* (2013.01)
(58) Field of Classification Search
CPC ........ G06Q 40/00; G06Q 40/02; G06Q 40/04; G06Q 40/06; G06Q 30/00; G06Q 30/06; G06Q 30/08

(Continued)

(56) References Cited

U.S. PATENT DOCUMENTS 6,766,304 B2 7/2004 Kemp, II et al.
6,772,132 B1 8/2004 Kemp, II et al.
(Continued)

OTHER PUBLICATIONS

Patsystems, J-Trader, Website, Last accessed May 1, 2009, 1 page.
(Continued)

*Primary Examiner* — Hani M Kazimi
(74) *Attorney, Agent, or Firm* — Chiesa Shahinian & Giantomasi PC

(57) ABSTRACT

This application discloses a display and/or user interface for viewing information relating to tradable items such as financial interests and/or for use in a trading system for such items. Offer and bid prices for the tradable item are displayed according to an alignment, e.g., vertically. The prices move along the alignment in accordance with received price updates. Persistence of at least a part of an earlier display is provided in a later display for indicating a market change or changes. A shift in the positions of one or more of the prices in the alignment and some visual persistence relative to one or more earlier prices provide an easily perceived visual indication to the viewer of changes in prices and direction of a market change or change relating to a reference value or benchmark from a first time to a second time. The displayed prices may include a last price, best offer and bid prices and depth of market prices. A cell is provided for each price and a color indicator for a price to be persisted is implemented, e.g., as a background coloring of the cells. Best offer and bid prices may be indicated by a first color, e.g., white, depth of market offer prices indicated by a second color or colors in one color family, e.g., green, and depth of market bid prices indicated by color or colors in another color family, e.g., red, with the particular color becoming more intense (e.g., darker) as the price worsens.

24 Claims, 14 Drawing Sheets

(58) Field of Classification Search
USPC .......................................... 705/35, 36 R, 37
See application file for complete search history.

(56) References Cited

U.S. PATENT DOCUMENTS

| | | |
|---|---|---|
| 6,938,011 B1 | 8/2005 | Kemp, II et al. |
| 7,127,424 B2 | 10/2006 | Kemp, II et al. |
| 7,228,289 B2 | 6/2007 | Brumfield et al. |
| 7,243,083 B2 | 7/2007 | Burns et al. |
| 7,373,327 B1 | 5/2008 | Kemp, II et al. |
| 7,389,268 B1 | 6/2008 | Kemp, II et al. |
| 7,424,450 B2 | 9/2008 | Kemp, II et al. |
| 7,437,325 B2 | 10/2008 | Kemp, II et al. |
| 7,505,932 B2 | 3/2009 | Kemp, II et al. |
| 7,509,276 B2 | 3/2009 | Brumfield et al. |
| 7,509,283 B2 | 3/2009 | Friesen et al. |
| 7,533,056 B2 | 5/2009 | Friesen et al. |
| 7,562,038 B1 | 7/2009 | Brumfield et al. |
| 7,567,929 B2 | 7/2009 | Kemp, II et al. |
| 7,676,411 B2 | 3/2010 | Kemp, II et al. |
| 7,680,724 B2 | 3/2010 | Kemp, II et al. |
| 7,685,055 B2 | 3/2010 | Brumfield et al. |
| 7,693,768 B2 | 4/2010 | Kemp, II et al. |
| 7,702,566 B2 | 4/2010 | Kemp, II et al. |
| 7,725,382 B2 | 5/2010 | Kemp, II et al. |
| 7,813,996 B2 | 10/2010 | Kemp, II et al. |
| 7,904,374 B2 | 3/2011 | Kemp, II et al. |
| 2002/0055899 A1* | 5/2002 | Williams ........................ 705/37 |
| 2004/0148247 A1 | 7/2004 | Miller et al. |
| 2005/0134607 A1* | 6/2005 | Purdy ................... G06T 11/206 345/629 |
| 2006/0155626 A1* | 7/2006 | Wigzell ................ G06Q 40/00 705/35 |
| 2006/0200405 A1 | 9/2006 | Burns et al. |
| 2006/0259382 A1 | 11/2006 | Kemp, II et al. |
| 2006/0259384 A1 | 11/2006 | Brumfield et al. |
| 2006/0271475 A1* | 11/2006 | Brumfield ............. G06Q 20/10 705/39 |
| 2008/0183639 A1* | 7/2008 | DiSalvo ................ G06Q 40/02 705/36 R |

OTHER PUBLICATIONS

Smartmoney, Map of the Market, Website, Last accessed Apr. 10, 2009, 3 pages.
Betgizmo, Betfair Trading Made Simple!, Website, Last accessed Apr. 23, 2009, 5 pages.
Trading Technologies, MD Trader, Website, 2 pages, Copyright 2006.
Patsystems, IQ-Trader, Website, 3 pages.
Patsystems, Patsystems Reflector—An Overview, Website, 7 pages.

* cited by examiner

DISPLAY/USER INTERFACE FOR TRADING SYSTEM

This application claims the benefit of U.S. Provisional Patent Application No. 61/301,923 filed Feb. 5, 2010 titled "Display/User Interface for Trading System" which is incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

This application contains material relating to the trading of financial interests. The trading of some financial interests is regulated, as for example by the United States Government, various State governments, and other governmental agencies within the United States and elsewhere. The disclosure herein is made solely in terms of logical and financial possibility and advantage, without regard to possible statutory, regulatory or other legal considerations. Nothing herein is intended as a statement or representation of any kind that any system, method or process proposed or discussed herein does or does not comply with any legal requirement whatsoever, in any jurisdiction; nor should it be taken or construed as doing so.

BACKGROUND OF THE INVENTION

This application discloses a display and/or user interface for viewing information relating to tradable items and/or for use in a trading system for trading items. Such items may include, but are not limited to, financial interests, including present, future, and contingent interests such as spot, futures, options, swaps, and forwards contracts in, for example, equity instruments such as: stocks; fixed income securities such as corporate, government and municipal bonds; mortgage-backed securities, collateralized mortgage obligations, loans, commercial paper and other debt instruments; commodities, including for example, energy, precious metals; foreign exchange; derivative and swap instruments; pollution credits; insurance. The application also discloses methods, systems and computer program products for implementing and using the display and/or user interface and for facilitating the presentation of information related to tradable items and the trading of items.

SUMMARY OF THE INVENTION

According to some embodiments, a display is provided on an electronic display device of market information related to a tradable item of the type described above. Market information may broadly comprise any quantitative or qualitative information relating to an item or items or the market for the item(s) in general. The display includes a price region or regions comprising prices or price levels of offers and bids for the tradable item. "Price" and "prices" refer to price(s) and/or price level(s) and/or information for determining a monetary value, etc. unless the context indicates otherwise. For example "price" can be an actual price value or a value, or other indicator derived from or based on information such as e.g., market and/or other information, yields, interest rates, prices, option possibilities, events, etc. A price may relate to a single tradable item or to a plurality of tradable items, and to a single trade or plurality of trades, e.g., a price may comprise a spread related to two or more legs of a spread trade, pair trade, or an arbitrage opportunity, etc.

The prices within the price region of the market information displays may include, according to some embodiments, a last executed or last price, a best offer price, a best bid price, and depth of market prices including at least one worse offer price and at least one worse bid price. In some embodiments depth of market offer prices and depth of market bid prices each comprise a plurality of prices. These prices may be received from one or more of exchanges, ECNs, brokers, venues, and the like, or calculated or derived from, or based on, market information.

According to some embodiments, individual prices are displayed in the price region(s) (hereinafter referred to simply as "price region") according to an orientation, e.g., an alignment. In many embodiments, use of the term "orientation" encompasses "alignment" and vice versa. According to some embodiments, the prices can be oriented or aligned along a line, e.g., a straight or curved or other line, or an axis or a circle or other figure or portion thereof, in a price region of the market information display. In one embodiment, the prices are oriented or aligned vertically, e.g., as a column alignment, and in another embodiment, the prices are oriented or aligned horizontally, e.g., as a row alignment, or in other orientations and alignments consistent with the disclosure herein.

According to some embodiments, in earlier and later displays of market information, prices move from the earlier to the later display in the orientation or alignment in accordance with received price updates, and persistence of at least a part of the earlier display in the later display. According to some embodiments, such persistence comprises a visible indicator. Providing earlier and later displays, e.g., at first and second times, in which at the second time a shift in the positions (or locations) of one or more of the prices in the orientation or alignment compared to the first time, and some visual persistence relative to one or more prices and/or positions or locations in the orientation or alignment provide an easily perceived visual indication to the viewer of changes in prices and direction of a market from the first time to the second time.

According to various embodiments, the persistence referred to above comprises at least one visual indicator associated with prices, e.g., the last price, and/or the best offer price and/or the best bid price, and/or a position or positions in the alignment, that at least some aspect of which persists from an earlier to a later market information display. Visual indicators may comprise: color, including white and black, variations, shading, gray scaling, etc., e.g., in background or the characters specifying the value of the price; line thickness and/or bolding, font type and/or sizing and/or bolding; and/or graphics including, text, geometrics, pictorial symbols, color icons; and/or flashing, etc.; and/or position or location; and/or combinations of the foregoing, but other types of visual indicators may also be used. As used herein, "color" may include color and gray scale shading and variations, e.g., within a color family, white and black, etc. Position or location may be indicated by a graphic, a value (e.g., price), a color, a designator (e.g., "high" or "low" or "last," etc.), etc.

According to some embodiments, one or more visual indicators or a part or parts thereof for a price or prices in earlier and later market information displays are maintained which provides an easily visually recognizable shift of prices in the price region. Simply by eyeing the offset or shift of the prices in the orientation or alignment indicated by a persisted visual indicator or indicators or part thereof from an earlier display to a later display, a viewer can instantly discern a change in market prices and direction. In some embodiments, a visual indicator quickly allows a viewer to locate the center or midway location of the orientation or alignment and the distance offset or shifted from the earlier to the later display. In some embodiments, a visual indicator or part thereof comprises a center or midway position or location in an orientation or alignment in earlier and later displays.

According to some embodiments, a visual indicator comprises color and/or a graphic associated with one or more prices. A color may facilitate distinguishing offer prices and bid prices. For example, in a display including a last price, associating a color and/or graphic with the last price and persisting that color and/or graphic with the value of the last price at a second time after at least one market price has changed, provides a shift in the orientation or alignment of the color, and/or graphic, which indicates a market change and direction. In another embodiment a color and/or graphic may be associated with the best offer and/or bid price. In the other embodiments, color and/or graphics may be associated with a depth of market price or prices.

According to some embodiments, the color(s) or graphic(s) that facilitates distinguishing offer prices and bid prices is located in a predetermined position or a position which provides or enhances distinguishing offer prices and bid prices. According to some embodiments, the color(s) and/or graphic(s) facilitates viewer perception in the orientation or alignment of bid prices and offer prices, with bid prices on one side of a visual indicator and offer prices on the other side in an earlier display. For example, the visual indicator may indicate a center or midway location of an orientation or alignment. "Center," as used herein, encompasses such midway locations and includes positions which can be perceived by a viewer to be more or less centered. A midway location may encompass midway in a part of a display, etc.

In some embodiments, in an initial or earlier display, e.g., at a first time, the position of the last price and/or a best price is centered in the orientation or alignment, e.g., the center or a midway location (which may be perceived as but may not be precisely a center position) in an alignment between offer and bid prices, with the position or location functioning as a part of a visual indicator in the price region relative to the offer prices and bid prices (which are respectively displayed on an offer side of the last price and a bid side of the last price). For example, in a vertical orientation or alignment, the offer depth of market prices are located above the last price and/or best offer price (position or location) and the bid depth of market prices are located below the last price and/or best offer price (position or location). In some of these embodiments, the last and/or best price(s) is centered in the orientation or alignment in an earlier display, or at a first time, e.g., when the display is first opened or run, or refreshed or reset, and a new last price is similarly centered in a later display, e.g., when the display is updated, e.g., in response to manual input or market changes, e.g., automatically by operation of a computer. In this embodiment, the centered last price and/or best price(s) in the displays provides at least part of a visual indicator.

According to one embodiment, in the later display, the positions of the best offer and the best bid prices are shifted from the positions in the earlier display and persistence associated therewith visually presents an indication of the market shift from a first time to a second time. According to some embodiments, centering of the last price in later displays which reflects a market price change or changes from an earlier display results in shifting of prices, e.g., by a distance related to the change(s) in market price(s).

An earlier display may be replaced by a later display in which prices, etc., are shifted in an orientation or alignment, gradually or suddenly, e.g., by "snapping" a later display to replace an earlier display. An earlier display may be replaced by a later display in response to user input, e.g., initiating a trade (discussed below), or requesting a reset or refresh, or automatically based on the occurrence of an event such as a price change or an external event. Algorithms known to those skilled in the art may be used to determine when to provide a later display. For example, a later display may be provided in response to a change in a price by one or more ticks, etc.

According to some embodiments, a cell is provided in a display for each price, and a visual indicator or part thereof comprising color is implemented as background coloring of the cell or cells.

In an embodiment in which the visual indicator or part thereof comprises color, in an initial or opening display, e.g., at a first time, depth of market offer prices are indicated by colors in one color family, e.g., green, and depth of market bid prices are indicated by colors in another color family, e.g., red, with the particular color or shade becoming more intense (e.g., become darker) as the price worsens, although other colors and indicator schemes may be used. For example, colors for better prices are lighter, and colors for worse prices are darker. According to an embodiment, in an opening or initial display, e.g., at a first time, the intensity of the color for both offer and bid prices is based on proximity to the last price and/or the best offer and bid prices, and one color family is used on one side of the last and/or best price(s) and another color family is used on the other side of the last and/or best price(s).

In such embodiments, the last price may be indicated by use of a markedly different color, e.g., gray, and the best offer and bid prices may be indicated by a markedly different color, e.g., white, compared to the color families for the offer and bid prices. While the value of the last price may change from an earlier to a later display, the visual indicator or part thereof, e.g., position and/or color, for the last price persists. Also, while the position in the orientation or alignment of a given price may change from an earlier to a later display, the visual indicator "sticks" with the value.

According to some embodiments, colors are selected to provide a heat mapping or histogram effect, and visually express a displayed depth of market and shifts in prices from earlier to later displays. In some embodiments, color is provided to indicate market depth prices with varying intensity within different color families for offer (e.g., green) and bid prices (e.g., red), in an initial or opening display, e.g., at a first time, which provides further visual indication and persistence to indicate market changes over time. For example, the intensity may vary gradually from lighter to darker (less intense to more intense), much like heat mapping.

In one embodiment, the combination of the offset of the prices indicated by a visual indicator or part thereof for the center of the price region and the color intensity described above, e.g., "mapping", provide a highly effective way of graphically indicating changes over time of market prices and direction in a market information display.

Where the visual indication comprises color and/or a graphic associated with a price or prices, according to some embodiments, the visual indicator assumes a default position in the earlier display which can easily be remembered by a viewer, e.g., a center position. Then, in a later display, the shift from center of the visual indicator indicates or represents a shift in price and market direction. Providing color, for example, via color families, as discussed above, provides more easily discernable shifts. For example, in an earlier display, one family of colors, e.g., green, is associated with offers, and other family, e.g., red, with bids, with the center of the orientation or alignment separating the two colors which each become more intense for worse prices, i.e., away from the best prices. Then, in a later display, with the colors persisted for the price values, the whole color "map" shifts, with more intense colors being at one or the other end of the display. This provides a very easy way to discern a shift even without focusing on the shift from center or other given position from an earlier display.

In some embodiments, a market information display may include a size or quantity indication associated with each offer and bid price. The quantity or size can be indicated graphically and/or textually. In some embodiments, the size indication is provided aligned with the associated price. In some embodiments, a display, e.g., an earlier display and/or a later display, is dynamic in that quantity information is dynamically updated.

In some embodiments, a market information display may reflect the market's movements toward or away from a reference value, or values, or range, e.g., a technical indicator such as a stop price, or other static value or range, or a dynamic value or range, serving as a reference value or benchmark, with colors selected to provide a heat mapping or histogram effect. For example, a reference value may be a value derived from price activity in a security predicting the general price direction of the security based on past patterns, e.g., indicators such as Relative Strength Index, Money Flow Index, Stochastics, MACD or Bollinger Bands, and a market information display may reflect the market's movements toward or away from that value or values.

According to some embodiments, a graphical user interface (GUI) that may be used to initiate trades incorporates a market information display as described above. Associated with such trades are order parameters and trading functionality, including a trade order size. According to some embodiments, the GUI may include regions for initiating a trade. According to these embodiments, selectable portions of the display device are provided corresponding to initial or best offer and bid prices and market depth prices at the first and second times, respectively, and a trade is at least initiated in response to selection of a selectable portion based on the price corresponding at least in part to the selected portion and a quantity which may be input and/or pre-set. For example, a buy button and a sell button may be provided aligned with each price. Selection of a buy or sell button, e.g., by a mouse click, initiates a trade of the item at the price aligned with the selected button (or a better price if available, in known fashion) in the associated trade order size.

A method according to an embodiment of the invention presents on an electronic display device information relating to bids and offers of an item traded on at least one venue. The display device is controlled by at least one computer which receives at least offer and bid prices at a first time and at a second time, and the method comprises, at the first time, the at least one computer causing the display device to display thereon at least: a first plurality of offer prices comprising a best offer price and at least one offer price worse than the best offer price; a first plurality of bid prices comprising a best bid price and at least one bid price worse than the best bid price; and a visual indicator which facilitates distinguishing offer prices and bid prices. The offer prices and the bid prices are displayed according to an alignment with (i) the offer prices on an offer side and the bid prices on a bid side as distinguished by the visual indicator or part thereof which is in a first position in the alignment, (ii) the best offer price closer to the first position than the at least one worse offer price and (ii) the best bid price closer to the first position than the at least one worse bid price.

The method further comprises, at the second time, when at least the best offer price and/or the best bid price received by the at least one computer is different from at least the best offer price and/or the best bid price displayed on the display device at the first time, the at least one computer causing the display device to display thereon at least: a second plurality of offer prices comprising a best offer price and at least one offer price worse than the best offer price; a second plurality of bid prices comprising a best bid price and at least one bid price worse than the best bid price; and the visual indicator. The offer and bid prices at the second time are displayed according to the alignment at the first time with (i) the visual indicator or part thereof in a position in the alignment at the second time different from the first position; (ii) the different positions of the visual indicator or part thereof at the second time indicate a change in at least one displayed price from the first time to the second time. According to one embodiment, a visual indicator comprises a first part which indicates position in an earlier display, e.g., a visual characteristic associated with a last price such as color and/or position and/or graphic and/or text, and a second part comprising a visual characteristic associated with a price that persists from the earlier to the later display, e.g., a visual characteristic associated with a best price or prices, or depth of market prices, such as color and/or graphics and/or text.

A system according to an embodiment of the invention presents on an electronic display device information relating to bids and offers of an item traded on at least one venue. The system comprises at least one computer which receives at least offer and bid prices at a first time and at a second time and a computer readable medium or medium on which is stored computer code that causes the at least one computer to at least carry out methods disclosed herein.

A computer readable medium or medium according to an embodiment of the invention stores there on computer code that causes a system, which comprises at least one computer which receives at least offer and bid prices at a first time and at a second time to perform methods disclosed herein.

According to some embodiments, a visual indicator or part thereof is displayed centered in the orientation or alignment between bid and offer prices.

According to some embodiments, the first plurality of offer prices plus the first plurality of bid prices at the first time are equal in number, and the second plurality of offer prices plus the second plurality of bid prices at the second time are equal in number and equal to the number at the first time.

According to some embodiments, each of the plurality of bid and offer prices are displayed at the first time and at the second time over a background, and the visual indicator or part thereof comprises the best bid price and the best offer price being displayed, at the first time, centered in the alignment over the same background which is different from a background displayed for any other price and, at the second time, spaced from centered over the same background as at the first time.

According to some embodiments, the visual indicator or part thereof comprises a graphic image, e.g., an icon or text word such as high, low, last, best, etc. in or adjacent to the orientation or alignment between the best offer price and the best bid price at the first and second times, and according to some embodiments, the graphic image, comprises a line extending between the best offer price and the best bid price at the first and second times.

According to some embodiments, a last price is displayed midway in the orientation or alignment at the first and second times and midway between the first plurality of bid prices and the first plurality of offer prices at the first time. In some embodiments, the first indicator part comprises a center position of the orientation or alignment.

According to some embodiments, the first plurality of offer prices comprises a plurality of offer prices worse than the best offer price, and the first plurality of bid prices comprises a plurality of bid prices worse than the best bid price; and wherein the second plurality of offer prices comprises a plurality of offer prices worse than the best offer price and the second plurality of bid prices comprises a plurality of bid prices worse than the best bid price.

According to some embodiments, backgrounds for prices are provided with a visual indicator, e.g., color. In one embodiment, color for a background for the at least one worse offer price is different from color for a background for the at least one worse bid price at the first and second times, wherein the background color for the at least one worse offer price at the first time and the at least one worse offer price at the second time is either the same or similar, and wherein the background color for the at least one worse bid price at the first time and the at least one worse bid price at the second time is either the same or similar, but the background color or colors for the at least one worse bid price at the second time is different from the background color or colors for the at least one worse offer price at the first and second times.

According to one embodiment, the background color of each of the plurality of worse offer prices is different from a background color for each of the plurality of worse bid prices at the first and second times, wherein the background color for each of the plurality of worse offer prices at the first time is either the same or similar, and each of the plurality of worse bid prices at the first time is either the same or similar, and wherein the background color for each of the plurality of worse bid prices at the second time is either the same or similar, and each of the plurality of worse offer prices at the second time is either the same or similar.

According to some embodiments, the background color for at least two of the plurality of worse offer prices is different but similar at the first and second times, and the background color for at least two of plurality of worse bid prices is different but similar at the first and second times, and wherein an intensity of the background colors increases for a worse price or prices compared to a better price or prices.

An algorithm assigns color to prices and, after a price update or reset, assigns previously assigned colors to the new prices which are placed in new positions in an alignment. As the display/GUI changes with changing prices, color is persisted by the algorithm as a visual indicator. Updated prices can be inserted and deleted in changed positions while maintaining color as visual persistence, thereby providing an easily perceived visual indication to the viewer of market change and direction from the first time to a second time by movement of color.

BRIEF DESCRIPTION OF THE DRAWINGS

The invention is illustrated in the figures of the accompanying drawings, which are meant to be exemplary and not limiting, and in which like references are intended to refer to like or corresponding parts, elements or functions.

DETAILED DESCRIPTION OF PREFERRED EMBODIMENTS

Figure 1:
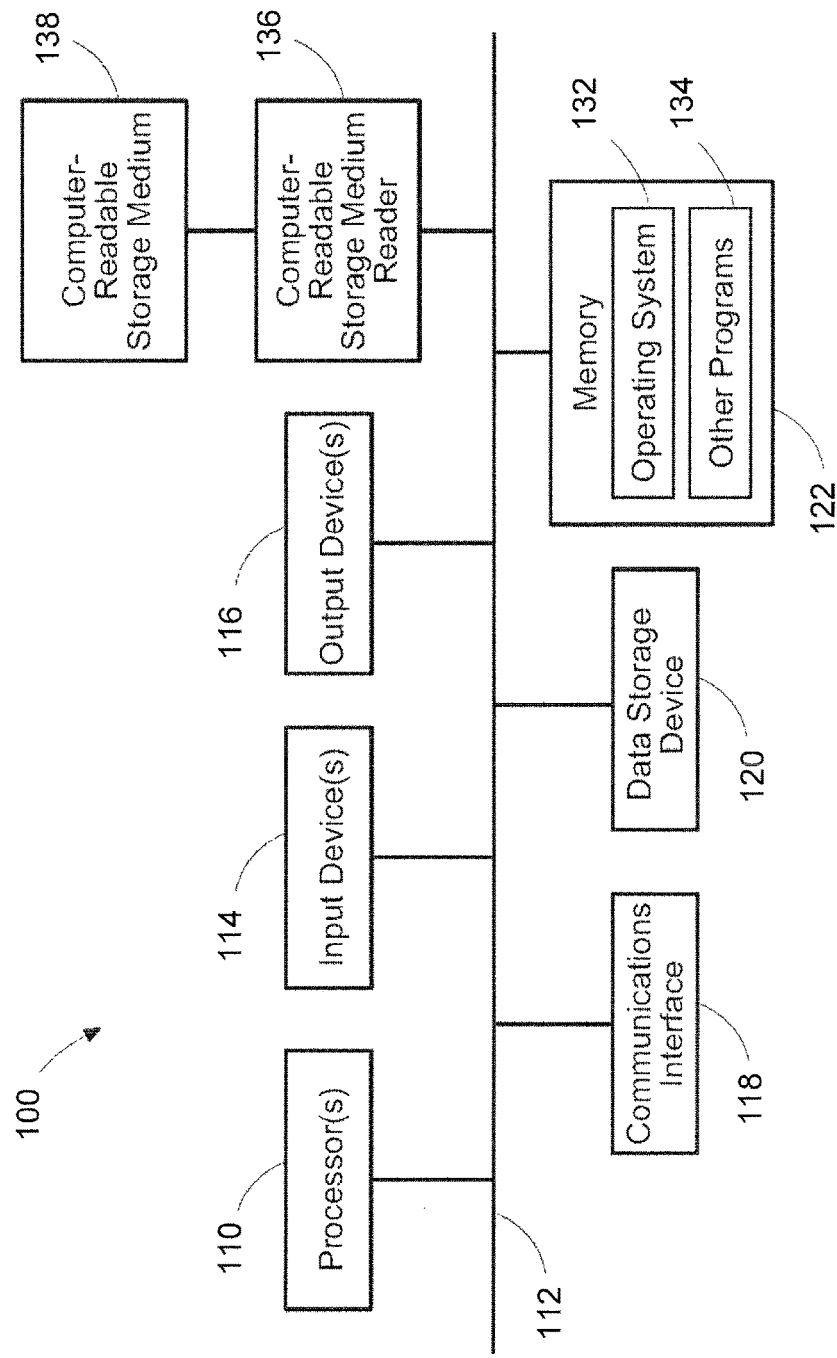
FIG. 1 is a block diagram depicting an exemplary computer system with which embodiments of the invention may at least partially be implemented.

Embodiments of the invention may be implemented by systems using one or more programmable digital computers. FIG. 1 depicts an example of one such computer system 100, which includes at least one processor 110, such as, e.g., an Intel or Advanced Micro Devices microprocessor, coupled to a communications channel or bus 112. The computer system 100 further includes at least one input device 114 such as, e.g., a keyboard, mouse, touch pad or screen, or other selection or pointing device, at least one output device 116 such as, e.g., an electronic display device, at least one communications interface 118, at least one data storage device 120 such as a magnetic disk or an optical disk, and memory 122 such as ROM and RAM, each coupled to the communications channel 112. The communications interface 118 may be coupled to a network (not depicted) such as the Internet.

Although the computer system 100 is shown in FIG. 1 to have only a single communications channel 112, a person skilled in the relevant arts will recognize that a computer system may have multiple channels (not depicted), including for example one or more busses, and that such channels may be interconnected, e.g., by one or more bridges. In such a configuration, components depicted in FIG. 1 as connected by a single channel 112 may interoperate, and may thereby be considered to be coupled to one another, despite being directly connected to different communications channels.

One skilled in the art will recognize that, although the data storage device 120 and memory 122 are depicted as different units, the data storage device 120 and memory 122 can be parts of the same unit or units, and that the functions of one can be shared in whole or in part by the other, e.g., as RAM disks, virtual memory, etc. It will also be appreciated that any particular computer may have multiple components of a given type, e.g., processors 110, input devices 114, communications interfaces 118, etc.

The data storage device 120 (FIG. 1) and/or memory 122 may store instructions executable by one or more processors or kinds of processors 110, data, or both. Some groups of instructions, possibly grouped with data, may make up one or more programs, which may include an operating system 132 such as Windows 7, Microsoft Windows XP® or Vista™, Linux®, Mac OS®, or Unix®. Other programs 134 may be stored instead of or in addition to the operating system. It will be appreciated that a computer system may also be implemented on platforms and operating systems other than those mentioned. Any operating system 132 or other program 134, or any part of either, may be written using one or more programming languages such as, e.g., Java®, C, C++, C#, Visual Basic®, VB.NET®, Perl, Ruby, Python, or other programming languages, possibly using object oriented design and/or coding techniques.

One skilled in the art will recognize that the computer system 100 (FIG. 1) may also include additional components and/or systems, such as network connections, additional memory, additional processors, network interfaces, input/output busses, for example. One skilled in the art will also recognize that the programs and data may be received by and stored in the system in alternative ways. For example, a computer-readable storage medium (CRSM) reader 136, such as, e.g., a magnetic disk drive, magneto-optical drive, optical disk drive, or flash drive, may be coupled to the communications channel 112 for reading from a CRSM 138 such as, e.g., a magnetic disk, a magneto-optical disk, an optical disk, or flash RAM. Alternatively, one or more CRSM readers may be coupled to the rest of the computer system 100, e.g., through a network interface (not depicted) or a communications interface 118. In any such configuration, however, the computer system 100 may receive programs and/or data via the CRSM reader 136. Further, it will be appreciated that the term "memory" herein is intended to include various types of suitable data storage media, whether permanent or temporary, including among other things the data storage device 120, the memory 122, and the CSRM 138.

Figure 2:
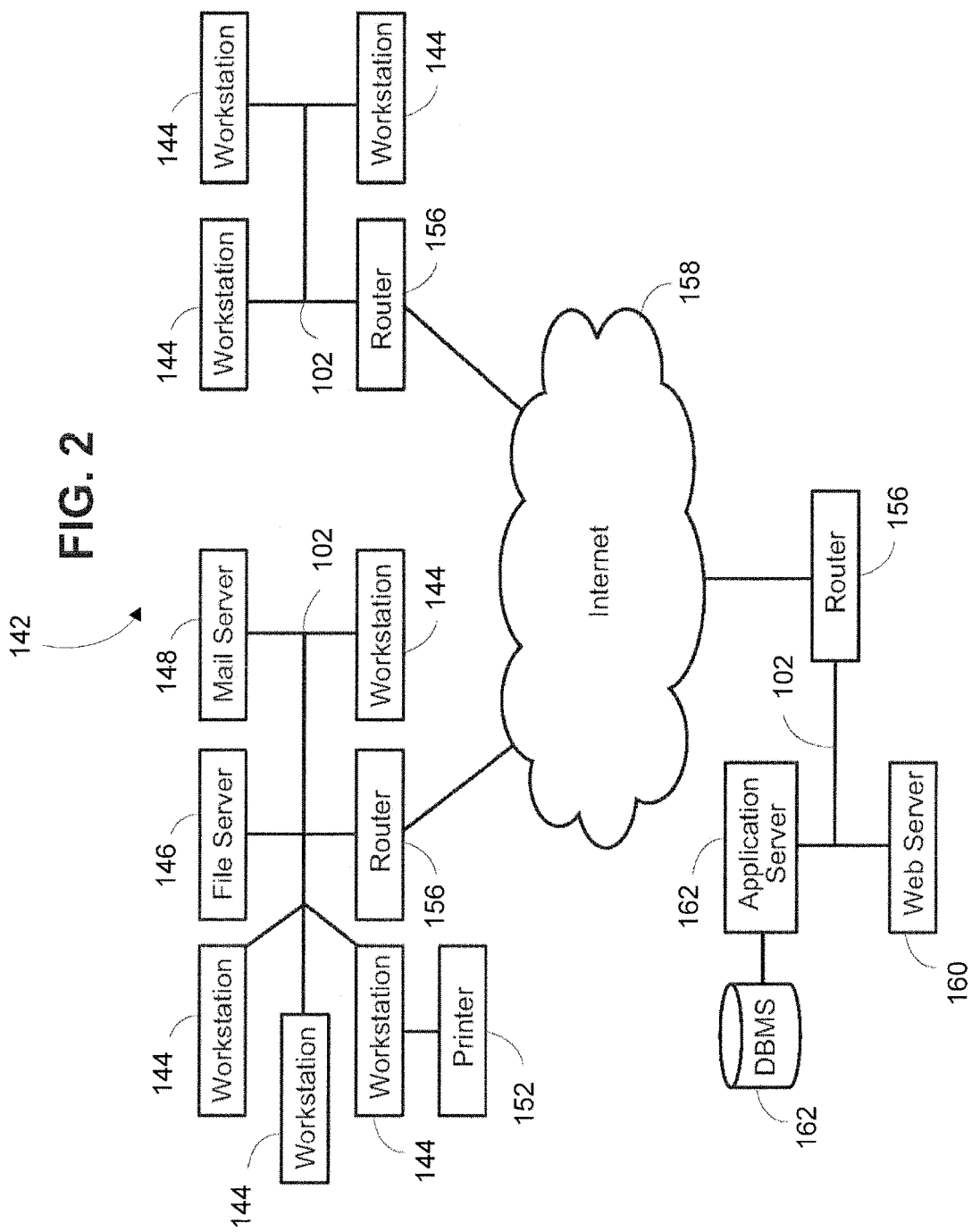
FIG. 2 is a block diagram depicting an exemplary interconnected network with which embodiments of the invention may at least partially be implemented.

Two or more computer systems 100 (FIG. 1) may communicate, e.g., in one or more networks, via, e.g., their respective communications interfaces 118 and/or network interfaces (not depicted). FIG. 2 is a block diagram depicting an example of one such interconnected network 142. Network 142 may, for example, connect one or more workstations 144 with each other and with other computer systems, such as file servers 146 or mail servers 148. A workstation 144 may comprise a computer system 100. The connection may be achieved tangibly, e.g., via Ethernet® or optical cables, or wirelessly, e.g., through use of modulated microwave signals according to the IEEE 802.11 family of standards. A computer workstation 144 or system 100 that participates in the network may send data to another computer workstation system in the network via the network connection.

One use of a network 142 (FIG. 2) is to enable a computer system to provide services to other computer systems, consume services provided by other computer systems, or both. For example, a file server 146 may provide common storage of files for one or more of the workstations 144 on a network 142. A workstation 144 sends data including a request for a file to the file server 146 via the network 142 and the file server 146 may respond by sending the data from the file back to the requesting workstation 144.

Further, a computer system may simultaneously act as a workstation, a server, and/or a client. For example, as depicted in FIG. 2, a workstation 144 is connected to a printer 152. That workstation 144 may allow users of other workstations on the network 142 to use the printer 152, thereby acting as a print server. At the same time, however, a user may be working at the workstation 144 on a document that is stored on the file server 146.

The network 142 (FIG. 2) may be connected to one or more other networks, e.g., via a router 156. A router 156 may also act as a firewall, monitoring and/or restricting the flow of data to and/or from the network 142 as configured to protect the network. A firewall may alternatively be a separate device (not pictured) from the router 156.

An internet may comprise a network of networks 142 (FIG. 2). The term "Internet" refers to the worldwide network of interconnected, packet-switched data networks that uses the Internet Protocol (IP) to route and transfer data. In the example depicted in FIG. 3, the Internet 158 provides a communications network over which computer systems in network 142 communicate. For example, a client and server on different networks may communicate via the Internet 158, e.g., a workstation 144 may request a World Wide Web document from a Web Server 160. The Web Server 160 may process the request and pass it to, e.g., an Application Server 162. The Application Server 162 may then conduct further processing, which may include, for example, sending data to and/or receiving data from one or more other data sources. Such a data source may include, e.g., other servers on the same computer system 100 or LAN 102, or a different computer system or LAN and/or a Database Management System ("DBMS") 162.

As will be recognized by those skilled in the relevant art, the terms "workstation," "client," and "server" are used herein to describe a computer's function in a particular context. A workstation may, for example, be a computer that one or more users work with directly, e.g., through a keyboard and monitor directly coupled to the computer system. A computer system that requests a service through a network is often referred to as a client, and a computer system that provides a service is often referred to as a server. But any particular workstation may be indistinguishable in its hardware, configuration, operating system, and/or other software from a client, server, or both.

The terms "client" and "server" may describe programs and running processes instead of or in addition to their application to computer systems described above. Generally, a (software) client may consume information and/or computational services provided by a (software) server.

Figure 3:
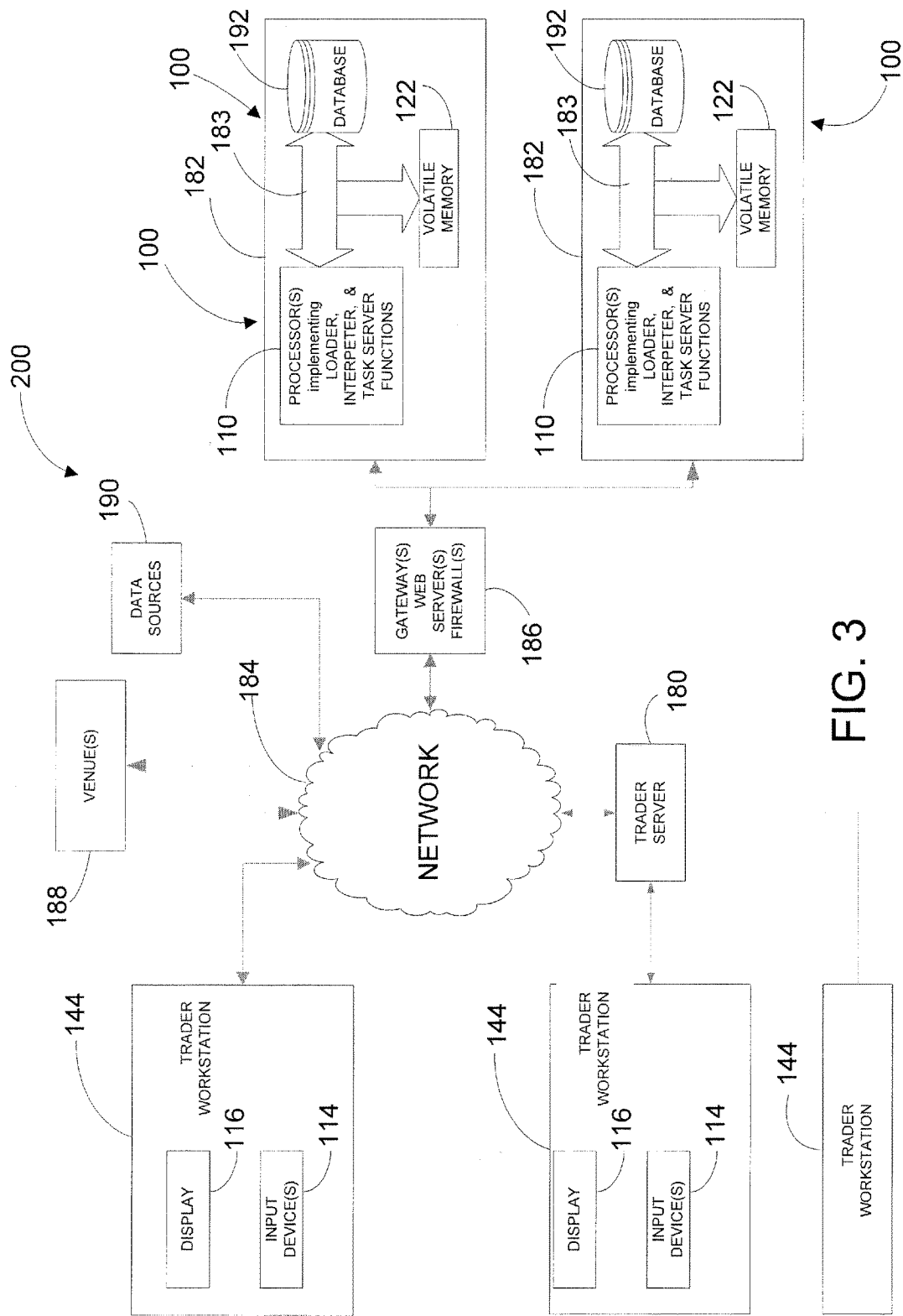
FIG. 3 is a block diagram depicting an embodiment of a computer system according to an embodiment of the invention.

FIG. 3 depicts one example of a computer network 200 configured as an electronic trading platform for computerized trading of items, e.g., financial interests as mentioned above. However, in other embodiments disclosed herein and/or evident to those of skill in the relevant arts from the disclosure herein, network 200 may be configured to trade other items. Network 200 may further be configured to perform other applications.

Network 200 according to an embodiment of the invention includes trader workstations 144, which may form part of a computer system (not shown in FIG. 3) and at least one other computer system 100 which communicate over a communications or computer network 184. For convenience, description of network 200 will proceed with respect to one other computer system 100 with the understanding that the network may comprise more than one other computer system 100. A computer system 100 comprises one or more computers 182 communicating over a LAN 183, and related processors, servers, memory and databases(s). The workstations 144 and the computer(s) 182 communicate over the network 184, which may comprise a private network, including leased lines and a router network or networks, and/or a public network such as the Internet, using, for example, the TCP/IP suite of protocols. The network 200 may comprise a closed network (including, e.g., a router network) and/or the Internet. Gateway directors, gateways, firewalls, etc. (represented by block 186) provide communication to and from the computer(s) 182 over the network 184. Gateway, web server and firewall computers and the functions they perform can be conventional and are not shown in the drawings or discussed in detail.

For convenience, a computer 182 (FIG. 3) is referred to herein as a "remote" computer. In one sense, a computer 182 is remote from a workstation 144 in that they are separated by a communications network. However, a computer 182 may be considered remote from a workstation 144 in the same LAN.

Embodiments of the invention may provide for processing and control of information and interfaces to be displayed by the display device(s) by the workstations 144 (FIG. 3) or the remote computer(s) 182, or by a remote computer or computers implemented as a distributed processing system comprising a node or nodes located local to the workstation(s) and a plurality of nodes located remote from the workstations, which may include a central location and distributed locations. In one embodiment, portions of the processing and control functions may be performed by the workstation(s) and the remote computer(s). An embodiment described below provides for such processing and control functions to be performed by the remote computer(s) 182, with the understanding other embodiments, including those just described, may be implemented and will be known to those of skill in the art.

Computer(s) 182 may have one or more processors, and have and/or have access to memory 122, which can be shared by various functions of the computer(s) 182. Memory 122 can store databases and software for processing and trading functionality, and computer(s) 182 may manage data storage and retrieval with respect to memory 122, and other memories which electronic exchange computer can access, e.g., directly and/or on a network such as a LAN or other network.

Computer(s) 182 may implement in software an interface server which interprets data and command inputs from trader workstations 144 and controls display of screens on trader workstation display device 116. Computer(s) 182 may also implement in software one or more task servers that process trading tasks or functions, and store and process data related to the trading tasks.

The computers 182 (FIG. 3) perform various tasks including: (a) loader functions; (b) interpreting data and command inputs from workstations 144; (c) controlling the display of information and interfaces by the workstations, including providing and controlling the display of market information; (d) trading functions, e.g., routing orders to venues 188 such as exchanges and ECNs for matching and/or execution; (e) matching orders for trade execution; (f) receiving market information from sources 190 thereof and/or venues 188; (g) managing database(s) 192, etc. The computers 182 may be connected in a LAN 183 to operate with databases and/or other computers, e.g., in the manner described in connection with FIGS. 1 and 2. The computer(s) may perform the functions described above and herein as a host, server or database manager.

One or more database(s) 192 (FIG. 3) store market data information for each tradable item that may be selected in GUI 400 by user input. The processor(s) 110 update the database(s) 192 based on new data received from venues 188 and sources 190. Market and other data are loaded into volatile memory 122 by a processor 110, so that current market data may be provided to the GUI, e.g., 400*a* in FIG. 4A. Trader work stations 144 may locally store market data, as updated by remote computer 182, or the market data may be processed for direct display in the GUI.

To perform one or more of the above functions and other functions, a remote computer 182 (FIG. 3) comprises processors 110, which implement among other functions loader, interpreter and task and other server functions, volatile memory 122 and one or more databases 192. The loader functions determine whether a requested task or function is authorized to be performed, and if so, where, using, e.g., a user/workstation ID database including permissions and one or more function tables. Depending upon the determination, a task may be performed by a processor within the remote computer receiving the request or by another remote computer via the LAN 183. The processor(s) 110 implement server functions, including controlling the display of information and interfaces by the workstations, including providing and controlling the display of market information, trading and order routing, order matching, receiving market information from venues 188 and/or sources 190 thereof and managing database(s) 192.

As mentioned, the network architecture of the network 200 depicted in FIG. 3 is exemplary, and other architectures may be employed as known in the art. For example, distributed computer system architectures may be employed. Trader workstations 144 may communicate with one or more local or regional computers or servers, which communicate with one or more host or central computers, or to still other local or regional computers which communicate with one or more venues 188, market data sources 190, or central computers. Also, a trader workstation 144 may communicate with both local and/or regional computers and to a venue 188, market data source 190 or central computer, or computers. Local and/or regional computers with which trader workstations 144 may communicate perform some of the functions otherwise performed by a host computer or server 182. For example, a local or regional computer linked to a number of trader work stations 144 may perform functions specific to those trader workstations while a centralized computer performs functions applicable to many trader workstations.

Although the plurality of trader workstations 144 are shown in FIG. 3 as having respective direct connections to network 184, there may alternatively be more or fewer connections between trader workstations 144 and network 184. For example, pluralities of trader workstations 144 may be connected to network 184 singly or in groups via LANs or WANs, and/or by private Electronic Communication Networks (ECNs) or public networks such as the Internet. Trader workstations 144 may represent a single station of a trading party, or a plurality of trading party stations of a trading party which communicate with system 100 via a trader server 180. Trader workstations 144 and computer(s) 182 preferably operate in a client/server architecture. Depending upon context, a "trading party" may be an individual, an individual in a firm, or a firm. A firm may be a bank, a brokerage or trading firm, etc. The term "user" is meant broadly and encompasses a person who is operating a trading party station on behalf of a trading party, e.g., on behalf of him or herself or on behalf of a firm.

In a preferred embodiment of the invention, a plurality of trader workstations 144 may be connected in a LAN of a firm such as a commercial or investment bank. Within such a firm, a workstation 144 may be employed for use by a trading party administrator or administrative user. Such a trader workstation 144 is referred to herein as a trading party administrative station. Parties that trade with each other may be referred to as counterparties and the workstations thereof as counterparty workstations.

Trader workstations 144 may comprise any suitable computer or computer system, including, for example, desktops, laptops, personal digital assistants (PDAs), local servers, or other computers or data processors, at least one output/display device 116 such as a computer monitor or other output device, and at least one input device 114 such as, for example, a keyboard, a mouse, a touch pad or screen, or other selection or pointing device.

According to some embodiments: trader workstations 144 include client software that interacts with computer(s) 182 to allow users to receive and view data from, and input and transmit data to, the computer(s) 182; each copy of the client software and/or each trading workstation may be provided with unique information to uniquely identify each copy of the client software and/or each trader workstation 144; computer(s) 182 may be implemented in any suitable single, and preferably multi-processor, commercially available computer, e.g., those of Data General Division of EMC Corp.; where the computer(s) 182 include multiple processors, data may be stored in space of volatile memory shared by all processors; and/or all functionality relative to workstations 144 may be performed by the computer(s) 182 under control of a single operating system.

According to some embodiments, one or more databases contains a record for each trader workstation 144 (or copy of client software) authorized to trade using system 200. Where a trading party comprises a firm and a plurality of trader computers, a record is stored in a database or databases 192 preferably for each trader workstation. Each record may contain profile information including unique customer information (referred to herein as "customer number") corresponding to the unique information for the copy of the client software or trading party station, unique firm information (referred to herein as "firm number") identifying the firm of which the trading party station is a part. In some embodiments in which, e.g., foreign currency is traded, a record may include credit information specifying a credit limit, e.g., in dollars or other currency, that a trading party (or firm) has extended to other trading parties (or firms) for each currency pair to be traded, e.g., U.S. Dollars/Euros, U.S. Dollars/Australian Dollars, U.S. Dollars/Japanese Yen, etc., for each tenor (or future time period), and the amount of credit currently used for a trading day. Each customer number is unique for each trading party station (or copy of client software) and corresponds to a specific trading party station (or copy of client software). The firm number is unique for each firm, but may be identical for each record corresponding to trader computers of the same firm.

Referring to FIG. 3, user input/output activity is performed through the use of interactive interface screens displayed on display devices 116 of trader workstations 144, using data provided by the computer(s) 182. Input processing is preferably conducted by "point and click" and/or keyboard keystroke methods using items and graphical input fields. For example, tasks associated with displayed items may be selected by either placing a cursor over the item corresponding to the task and activating an instructional address link by activating the "select" switch, or button, or wheel, on a mouse or other pointer, to select the item, or a corresponding number of a menu item may be selected at the command line by using keystrokes from the keyboard to select a corresponding command. For example, a user may enter commands by entering a keystroke combination corresponding to an identifier such as a number associated with a listing in a menu. Data may be input by placing the cursor over a desired input field, which may be identified by associated text displayed with the input field, and activating a pointer switch to select the field, and typing data in from the keyboard. Thus input functions are typically accomplished in embodiments such as the one described by positioning a cursor within ("pointing" to) a desired image area and activating a control switch on a mouse ("clicking") to select an item associated with the image area, or analogous functioning of other pointing devices.

Figure 4A:
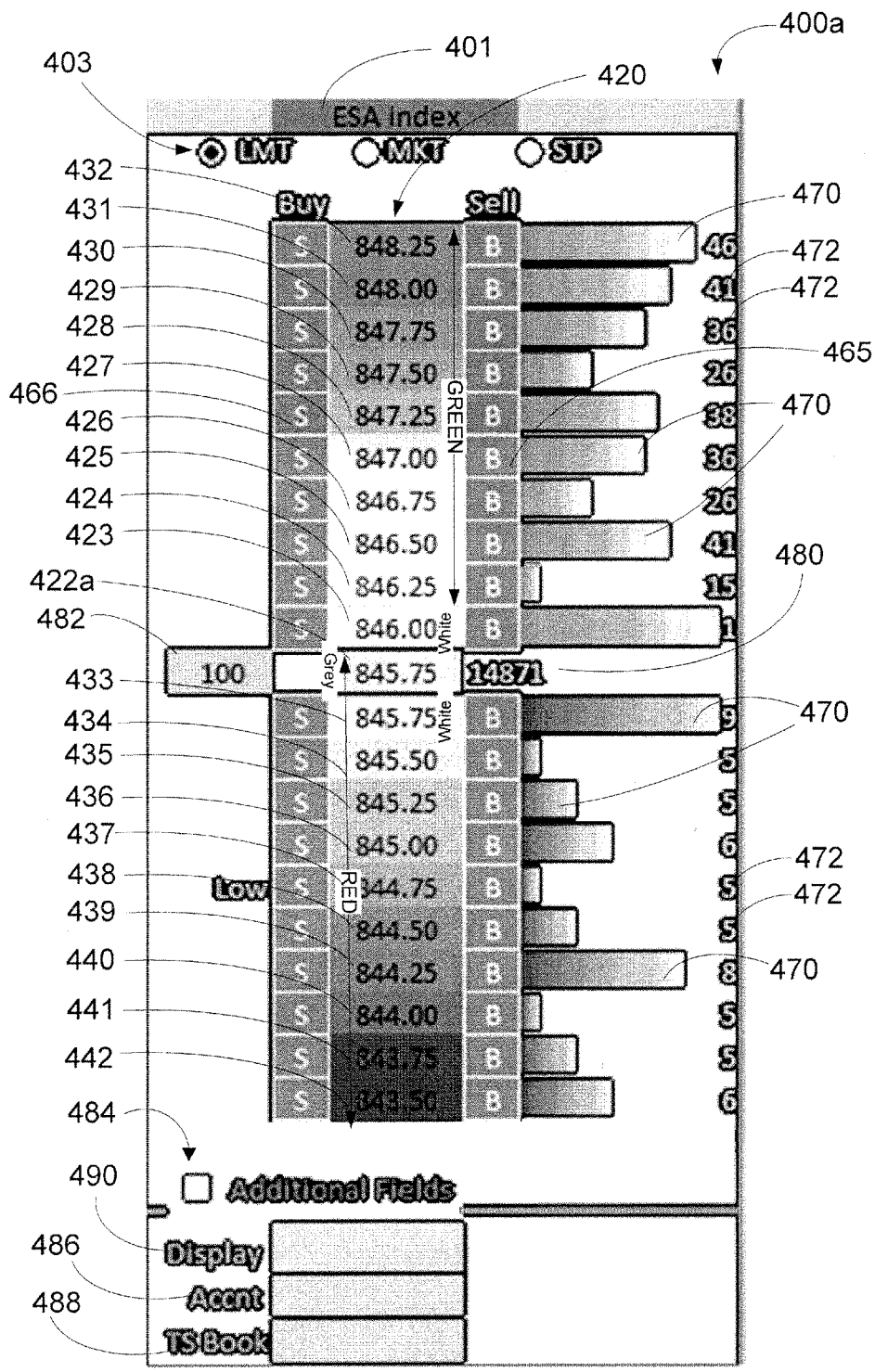
FIGS. 4A and 4B depict illustrations of embodiments of a graphical user interface according to an embodiment of the invention including a market information display which is displayed by a display device of the system depicted in FIG. 3 at a time that graphical user interface was opened or refreshed or reset.
Figure 4B:
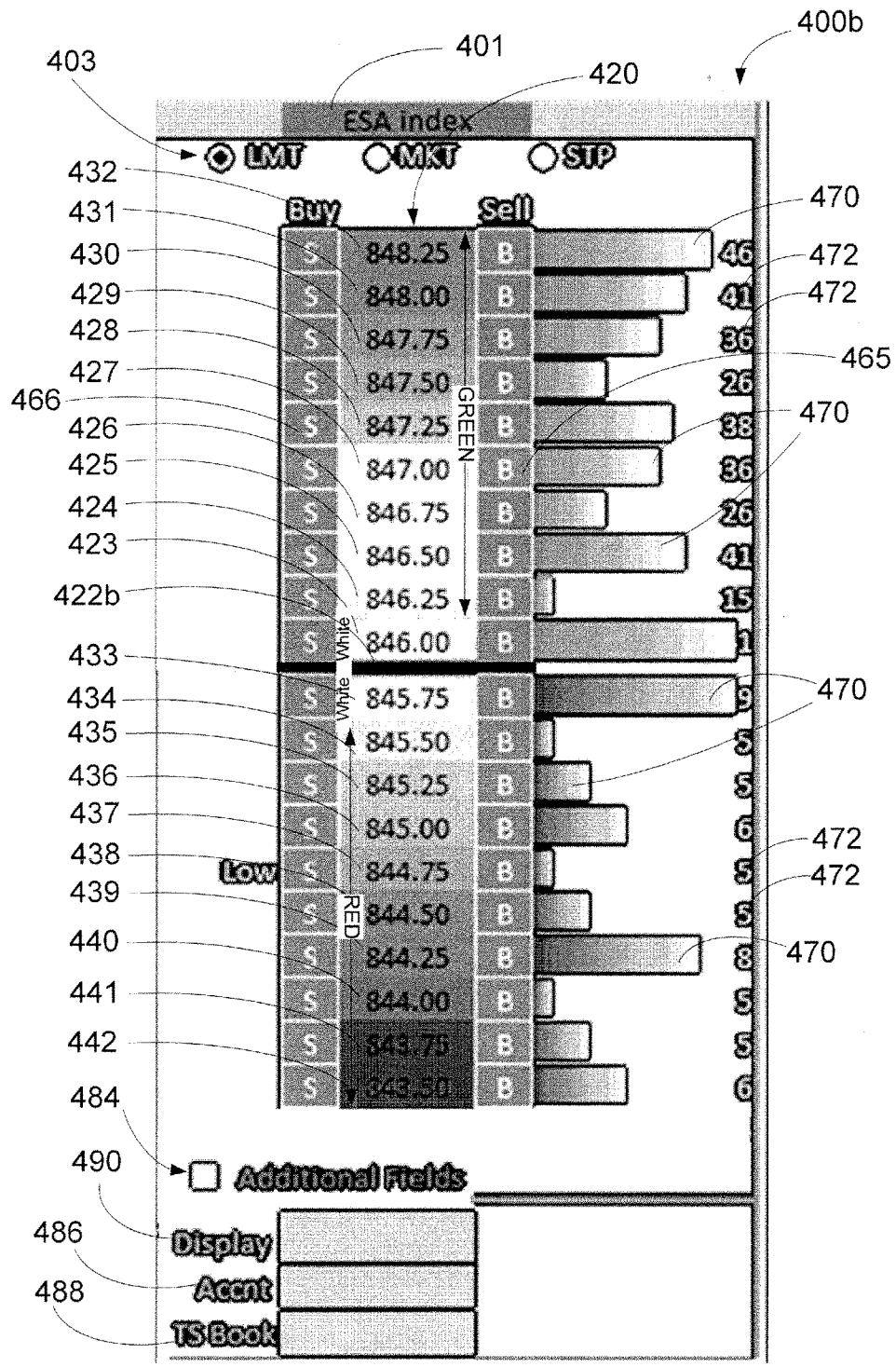

In some embodiments, a trader workstation 144 (FIG. 3) displays a display/trading graphical user interface (GUI) 400a,b as shown in FIGS. 4A, 4B, respectively. The display of the GUI as depicted in FIGS. 4A and 4B provides certain market information and/or allows a user to initiate trades of quantities of different types of tradable items.

Figure 5A:
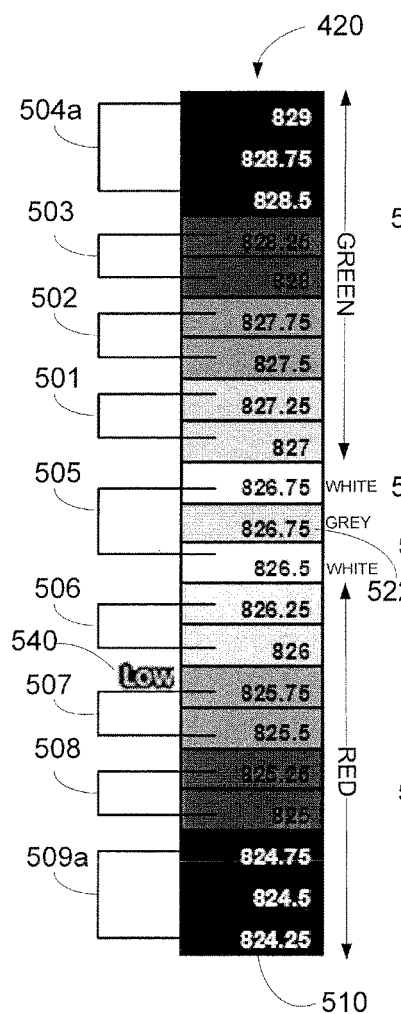
FIGS. 5A, 5B and 5C depict illustrations of a portion of earlier and later displays of the graphical user interface depicted in FIG. 4A, at a first time, e.g., when the interface was opened or refreshed or reset in FIG. 5A, and at second times after the interface was updated in FIGS. 5B and 5C.
Figure 5B:
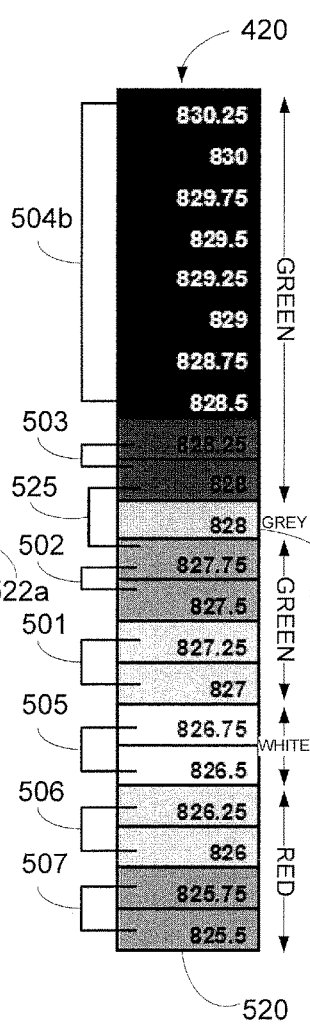
Figure 5C:
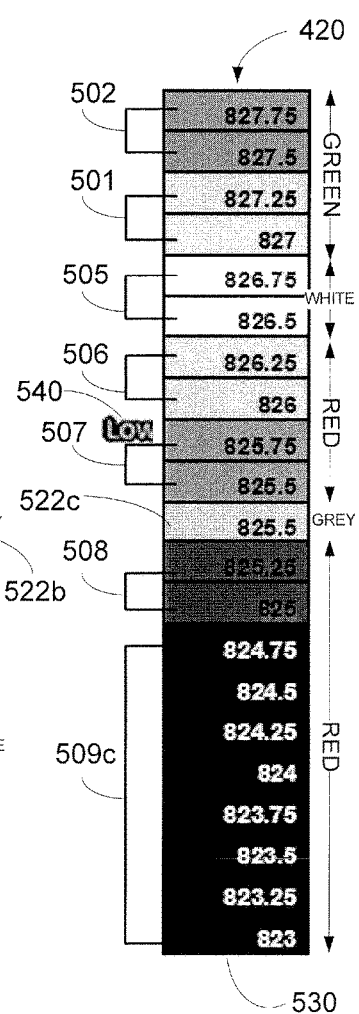

According to some embodiments, the GUI is implemented in at least one computer, e.g., a computer 182 and/or a work station 144. In one embodiment, the GUI is implemented in at least one computer 182 (FIG. 3) which provides display information for the GUI 400a to trader workstation 144 over the network 184. The trader workstation 144 provides user input to at least one computer 182 over the network 184. FIGS. 4A and 5A, discussed below, show earlier displays of the GUI 400a and a price region 420 of the GUI, respectively, which display market information at a first time, e.g., when the GUI was just opened or refreshed or reset, and prior to being supplied with updated market information or initiating a trade. FIGS. 5B and 5C depict the price region portion of later displays of the GUI 400a, e.g., at second times after updating.

An identifier region 401 at the top of GUI 400a (FIG. 4A) displays the identity of the item, here "ESA Index," about which the GUI displays information and through which trading of the item can at least be initiated. The item can be selected from a drop down menu associated with region 401, or from another screen, or dragged and dropped or entered via a keyboard. Entering an identifier, name or abbreviation for the item could launch a search or a drop-down list at the closest match. In one embodiment, previously entered items are saved and appear in a dropdown list. Below the identifier region 401, the interface 400a provides radio buttons 403 for selecting order-type options ("LMT" for limit order, "MKT" for market order and "STP" for stop order). As illustrated in FIG. 4A, the limit order ("LMT") option was selected. In other embodiments, radio buttons 403 may be provided for other order-type options. These order types may be used as defaults in a Speed Trading mode described below. In other embodiments, radio buttons 403 may be provided for other order-type options, such as a stop-limit order, which may combine the features of a stop order and a limit order.

According to some embodiments, the GUI 400*a* (FIG. 4A) displays a price region 420 comprising prices of offers and bids for the tradable item. According to other embodiments involving multiple trades or, for example, spread trading, pair trading, or an arbitrage opportunity, the GUI 400*a* (FIG. 4A) may display multiple price regions 420, separately displaying prices relating to, for example, each trade.

In the illustrated embodiment comprising prices of offers and bids for a single trade, the individual prices are oriented or aligned in an alignment comprising a straight line or column extending vertically in region 420. GUI 400*a* shows prices 430, 431, 432 . . . 442 which represent actual prices received via a feed from one or more of exchanges, ECNs, brokers, venues, and the like. The prices may, for example be provided by venues 188 (FIG. 3), data sources 190. Although the GUI 400*a* embodiment in FIG. 4A shows the prices separated by 0.25, this does not have to be the case. In practice, the prices in the display would reflect those received in the actual market and the increments would be the same or different or a minimum tick. Although the prices in FIG. 4A are actual prices, as discussed above, calculated or derived, etc., values may be provided as prices.

In other embodiments, GUI 400*a* may show prices 430, 431, 432 . . . 442 which represent each possible price, i.e., each possible price increment or tick, received via a feed from one or more of exchanges, ECNs, brokers, venues, and the like, even if no actual bids or offers are associated with that price. Such a configuration may allow an alternative view of the market and market depth by displaying even those prices which have no current size or quantity indication.

In other embodiments, the prices may be displayed in any suitable orientation or alignment, and may be oriented or aligned in different directions. For example, the prices may be oriented or aligned extending along a horizontally extending straight line or a curved line or a circle or other figure or portion thereof in a price region. In an embodiment in which the prices are oriented or aligned horizontally, the alignment extends as a row instead of as a column for a vertical alignment or orientation.

In some embodiments, the GUI 400*a, b* includes an optional size or quantity indication with each offer and bid price, which, in one embodiment, may be disabled based on display preferences. For example, in the embodiments illustrated in FIGS. 4A and 4B, a bar 470 extends horizontally from and in alignment with each price, and a number 472 is displayed adjacent the end of the respective bar, with the numbers aligned in a column. Each number 472 represents, and the length of each bar 470 is related to, e.g., proportional to, the total quantity of the item available at the aligned price to be traded at a venue or venues. According to one embodiment, the display depicted in FIG. 4A is dynamic at least with respect to quantities or sizes. Thus, without a refresh or reset that repositions price values, the display in FIG. 4A dynamically updates quantity information. This can be done as changes are received by a computer 182, or slowed to assist readability, or periodically, etc.

The prices in GUI 400*a* (FIG. 4A) include a last price 422*a*, a best offer price 423, a best bid price 433 and depth of market offer prices 424-432 and depth of market bid prices 434-442. In the embodiments of FIGS. 4-5, a visual indicator comprises color and/or position. For example, the visual indicator may comprise color alone, or may comprise a part including color and a part including position.

According to one embodiment, in an earlier display, the last price 422*a*, or the position thereof, functions as at least part of a visual indicator and is centered relative to the offer prices and bid prices (which are respectively displayed on an offer side of the last price, e.g., above the last price, and on a bid side of the last price, e.g., below the last price in the illustrated embodiment). In the illustrated embodiment, the last price is centered in the price region 420 when the GUI 400*a, b* is first opened or run, or refreshed or reset, or after a trade has been initiated. Such centering of the then best and market depth prices about the last price in an earlier display and some visual persistence in a later display relative to a price or prices, provide an easily perceived visual indication to the viewer of market change and direction from a first time which is associated with an earlier display to the second time, which is associated with a later display, as discussed below in connection with FIGS. 5A, 5B and 5C.

Associated with one or more prices (including the best offer and bid prices) in the embodiment of GUI 400*a, b* depicted in FIGS. 4A and 4B is a visual indicator or part thereof. Maintaining some aspect or part of a visual indicator relating to a price or prices from an earlier display to a later display provides an embodiment of the persistence referred to above. In the embodiment illustrated in FIGS. 4A and 4B, a part of a visual indicator comprises color, but other types of visual indicators may be used as discussed above. As mentioned above, color alone without a position indicator also facilitates visualization of a price change and shifting of price values from an earlier to a later display.

According to one embodiment, a cell is provided for each price and an embodiment of at least a part of a visual indicator is implemented as background color in a cell or cells. For example, different colors (including shades of colors, gray scale, etc., as discussed above) may be used. According to one embodiment, the colors are selected to provide a heat mapping or histogram effect, and express the degree to which an individual market depth price differs from the last price. However, as mentioned, other visual indicators instead of color and various combinations of colors and shades, may be used as discussed above.

According to some embodiments, a first part of a visual indicator comprises a position or location of a price or graphic or a color, e.g., the center or midway location in the alignment, such as the last price or a bold line, etc., and a second part of a visual indicator comprises color associated with at least one price.

According to one implementation, in an earlier display such as in FIG. 4A, depth of market offer prices 424-432 are indicated by background colors in the green family and depth of market bid 534-442 prices are indicated by background colors in the red family, with the particular color or shade becoming more intense (e.g., become darker) as the price worsens, although other colors and indicator schemes may be used. For example, background color for prices closer to the last price or best price(s), i.e., better prices, are lighter, and background color for prices farther from the last price or best price(s), i.e., worse prices, are darker. In other words, the intensity of the background color for the prices is based on proximity to the last or best price. In an embodiment, the first part of the visual indicator may comprise the position and/or background color of the last price 422*a*. In another embodiment, a graphic or text indicator may be used. Last price 422*a* may also be indicated by use of a markedly different background color, e.g., gray. In an embodiment, the second part of the visual indicator may be associated with the best prices, e.g., the best offer and bid prices may comprise a markedly different color, e.g., white, while depth of market prices may be indicated by a second part of the visual indicator comprising, e.g., a markedly different color, e.g., red and green. In other embodiments, the second part of the visual indicator may comprise a graphic or text indicator.

FIGS. 4A and 4B illustrate this coloring scheme with gray scale and the labels "red," "green," "white" and "gray" to indicate background color family and actual colors. On the offer side of the last price 422a indicated by gray, extending away from the last price, are: the best offer price 423, indicated by white; and the depth of market offer prices 424-432, indicated by colors in the green family with the background color intensity increasing from price 424 to price 432. The background color indicating depth of market prices on the bid side proceeds similarly, but indicated by colors in the red family. In some embodiments, the same color may be used for a number of adjacent depths of market prices to provide a cluster effect. (e.g., see FIG. 4A and FIG. 5A).

The color scheme used in the embodiments of GUI 400a, b depicted in FIGS. 4A and 4B quickly allows a user to ascertain the change in the item's prices as new market information is provided to the trader workstation 144. This is illustrated in the price region sequence shown in FIGS. 5A, 5B and 5C, as discussed below.

The computer 182 (FIG. 3) that implements the GUIs 400a, b receives market information, preferably continuously and on a real time basis, from one or more venues 188 or market data sources 190. The client software in the trader workstations 144 processes the market information received from a computer 182 and causes quantity information in the GUI 400a, b (FIGS. 4A and 4B) displayed on the display device 116 to be updated. According to an embodiment, when the GUI 400a, b is opened or first run at the trader workstation 144, colors may be assigned to various bid and offer market prices according to a color scheme such as the one described above, as illustrated in FIGS. 4A, B and 5A.

For example in the GUI 400a illustrated in FIG. 4A, the best offer price 433 and the best bid price 423, indicated by a white background, before updating are "845.75" and "846.00," respectively, and the last price 422a, indicated by a gray background, is 845.75. (In FIG. 5A, the best offer and bid prices 505, indicated by a white background, before updating are "826.75" and "826.5," respectively, and the last price 522a, indicated by a gray background, is 826.75.)

FIG. 4B shows a variation of the GUI 400a shown in FIG. 4A. GUI 400b in FIG. 4B does not display a last price, total volume traded during the current trading session, or order size to be traded upon user input, in the center of the price display. Instead, the GUI 400b only shows a center reference 422b in the form of a bold line, which, and/or the position thereof, may form part of a visual indicator. However, operation is substantially the same as for GUI 400a. For example, elements such as last price, total volume traded, etc., could be displayed in another section of the GUI 400b, or on another screen, or in a pop-up or floating window. However, overall, GUI 400b operates the same the as GUI 400a.

FIGS. 5A, 5B and 5C illustrate the dynamic nature of the price region 420 as the information presented by the GUI 400a is updated to reflect received new market information. (For clarity, FIGS. 5A, 5B and 5C include only the price region 420, and not other elements of the GUI 400a depicted in FIG. 4A.) FIG. 5A illustrates the price region of GUI 400a at a first time, e.g., when the GUI is first run or after being refreshed or reset. FIG. 5B illustrates the price region 420 at a second time updated to reflect an increase in the last price from 826.75 (FIG. 5A) to 828 (FIG. 5B).

Remote computer 182 (FIG. 3) assigns background color to various cells of the GUI display according to a protocol, e.g., stored in database 192 or other non-volatile memory. One exemplary protocol assigns colors as described above in connection with FIG. 4A. According to this protocol, referring to FIG. 5A, white is associated with the cells 501 displaying the best offer and bid, gray with the cell 522 displaying the last price, and discrete colors in the green and red families are associated with the depth of market prices. A discrete color may be associated with each market depth price, or a discrete color may be associated with two or more adjacent market depth prices, as discussed above. As mentioned, this may provide a cluster-effect visual impression. In the embodiment illustrated in FIGS. 5A, 5B and 5C, discrete colors are associated with two or more adjacent prices. For example, in FIG. 5A, the cells for prices 501 have the same green background family coloring which is the least intense in the family because they are closest to the best offer price. Similarly, the cells for prices 502 have the same green background family coloring, but more intense than the cell coloring for prices 502. In FIG. 5A, the cell coloring for the depth of field levels is balanced in intensity for offers and bids.

In order to provide a measure of persistence at a second time relating back to the previous market prices at the first time reflected in the GUI price region depicted in FIG. 5A, an association of color and price does not change with updated market information, regardless of whether the price value in a later display changed from an offer to a bid and vice versa, except that while a gray background continues to indicate the last price, the value of the last price changes. Accordingly, the old best offer and bid prices continue to be indicated by a white background, but they are no longer adjacent the new last price, and have moved vertically down at the second time in FIG. 5B compared to FIG. 5A by a distance related to the change in market prices. Similarly, while the background color of the price value of "826" is maintained from FIG. 5A to FIG. 5C, that price changed from a bid to an offer. Meanwhile, the new last price assumes the center location in the price region 420 and continues to be indicated by a gray background. If, for example, the market falls at the second time with respect to the item, the interface will be updated such that the location of the market price "845.75" would no longer be centered in the price region 420.

A comparison of FIGS. 5A and 5B based only on the white background coloring in the price alignment shows a downward shift in the market by five prices. Simply by eyeing the offset or shift of the prices indicated by white from the center of the price region, a viewer instantly discerns the change in market prices and direction from the FIG. 5A starting time. Providing a visual indication of the center of the price region quickly allows a viewer to locate the center of the price region and the distance offset or shift to the white cells for the last best offer and bid prices. In the embodiment illustrated in FIGS. 5A-C, the center of the price region is indicated by color, specifically in this embodiment, by a gray background, but any suitable graphic(s), geometric(s), pictorial symbol(s), icon(s), etc., flashing, may be used, e.g., a bold line as depicted in FIG. 4B.

FIG. 5C depicts a price region 420 illustrating a similar visual indication of market change at a third time relative to the first time for a rally in market prices, e.g., the last price increasing by five prices.

As FIGS. 5A-5C illustrate, associating background color with a price or prices, e.g., with varying intensity within families provides further visual indication and persistence to indicate market changes over time. In FIGS. 5A, 5B and 5C, prices with the same coloring and intensity are referenced by brackets and a reference number that is carried from one figure to the other. Thus, "501" appears in each of FIGS. 5A-C, but in different locations reflecting changes in market prices. Since the number of cells in the market depth prices farthest from the best offer and bid prices, which are the most intense, change from figure to figure, the same reference number is used followed by "a," "b" or "c," e.g., in FIGS. 5A and 5B-504*a* and 504*b* and in FIGS. 5A and 5C-509*a* and 509*c*. Thus, the most intense of the offer market depth prices in FIG. 5A (three levels) is designated 504*a*, and the corresponding most intense of the offer market depth prices in FIG. 5B (eight levels) is designated 504*b*.

In the embodiment of FIGS. 5A, 5B and 5C, the size of the price region, i.e., the number of prices displayed, is the same and does not change with price changes. (In other embodiments, the number of prices may change and the visual indicator takes this into account.) Changes in market prices are clearly indicated by an imbalance in the intensity of the market depth cells. For example, as shown in FIG. 5B, the background for the offer market depth designated by 504*b* includes eight prices while there is no bid market depth with a corresponding intensity (i.e., no 509*b* cells). Therefore, it is readily apparent just from color, and not necessarily with any persistence of a position from the display of FIG. 5A to the display of FIG. 5B or 5C, that market prices moved higher by a number of prices or ticks represented by the imbalance. A similar effect is apparent in FIG. 5C.

In some embodiments, a visual indicator may comprise color associated with one or a few prices, and in other embodiments, with most or all prices. In either case, maintaining color persistence provides a visual indication of market price changes from earlier to later displays. In one embodiment, the combination of the offset of the prices indicated by white price backgrounds from the center of the price region and the color intensity "mapping" described above, provide a highly effective way of graphically indicating changes in market prices and direction over time.

As mentioned, FIGS. 4A, B and 5A (in which only the price region 420 portion is shown) illustrate the GUI 400*a*, *b* at start-up and after a refresh or reset. According to some embodiments, the GUI may be refreshed or reset, e.g., in response to user input, e.g., a mouse click selected a given region of the GUI or a given keystroke sequence or combination, or automatically without user input. Examples of user input to request a refresh or reset are selection of the last price by a mouse key or keyboard stroke(s), or entry of a sequence or combination of keyboard strokes, etc. Examples of automatic refreshing or resetting are a change in a price or prices or benchmark, etc., by a given amount, or in response to a given low or high, etc., or the occurrence of an external event, at predetermined intervals or times, etc. After a refresh or reset, the GUI is re-centered to the configurations illustrated in FIGS. 4A, B and 5A, where the offer depth of market color family (e.g., green) is above the best offer, and the bid depth of market family color (e.g., red) is below the best bid, and the best offer and bid prices, indicated by, e.g., white, are immediately above and below the centered last price. The background color(s) for prices within each market color family may be selected, but need not be, in accordance with local, country, or market conventions and/or customs, e.g., green or blue for offers and red for bids. Depending upon background color, font color(s) may also be selected, but need not be, in accordance with local, country, or market conventions and/or customs.

The display/GUI 400*a*, 400*b* depicted in FIGS. 4A and 4B displays other information and may be used as a trading interface. As discussed above, the display/GUI 400*a*, 400*b* displays quantity information as bars 470 and numerics 472. In the illustrated embodiment, the quantity information represented by a bar or numeric indicates the total quantity of all bids and offers at the price with which the quantity bar or numeric is aligned. According to one embodiment, additional information may be provided regarding size by varying the intensity of a color of the bar. For example, such color intensity may used to provide a heat mapping or histogram effect. In conformance with the color scheme used for depth of market offer and bid prices, the bars may be colored in the same family as the depth of market offer and bid prices, e.g., offer quantities in the green family and bid quantities in the red family. In addition, each volume bar may be colored the same as the cell of the price with which the bar is associated.

In one embodiment of the GUI 400*a* (FIG. 4A), a region 480 may be provided adjacent to one side of the last price 422*a* to represent the total volume traded during the current trading session (or specified period of time), and adjacent the other side of the last price, a region 482 may be provided to represent an order size which is to be traded upon user input to initiate a trade, as described below. The total volume number is provided over the network 184 (FIG. 3) by a computer 182, and the order size may be provided in region 482 by a default (e.g., a system set minimum tradable size), and/or set by a user via a drop down menu, e.g., including size check boxes (e.g., "5", "10", "20", "100", etc.) by mouse clicking or using keyboard arrows, or keyed into the cell, etc.

Embodiments of the GUI 400*a*, *b* may include indications of "High" and "Low" price for a trade in the current trading session, and offer and bid prices for the item with currently open, unexecuted orders. The GUI 400*a*, *b* in FIGS. 4A and 4B indicates a trading session "Low" of 844.75. A visual indicator or part thereof may comprise text such as a designator such as "high" or "low." Referring to FIGS. 5A and 5C, the position or location of the "Low" designator 540 has moved five ticks from FIG. 5A to FIG. 5C. This change may be used as a visual indicator or part thereof to indicate price movement from FIG. 5A to FIG. 5C.

Embodiments of the GUI 400*a*, *b* (FIGS. 4A and B) may include an "Additional Fields" region 484 at the bottom thereof activated by a check box. In response to selection of the check box, GUI 400*a*, *b* provide additional fields (not shown) for entering or changing default order details. As discussed below, embodiments of the GUI may be used for initiating trades, and in such embodiments, trade initiation may take place with the additional fields displayed or not displayed. For certain types of trades, certain trader input order information is required for a venue, etc. to acknowledge or accept a sent order. Other details may provide additional instructions to the venue on how the order should be worked. These details may be displayed on the GUI 400*a*, *b*, or in other embodiments, may be defaulted to certain values in another setup screen.

Embodiments of GUI 400*a*, *b* may include, as additional fields at the bottom, display-type information ("Display") 490, account information ("Accnt") 486, and TradeBook® information ("TS Book") 488. (TradeBook® is a proprietary trading system owned by Bloomberg TradeBook LLC.) For example, the Display field 490 allows the trader to specify how much or quantity of a trader order to display, and how much to keep in hidden or in "Reserve" as in a Reserve or Iceberg order. The Accnt field 486 allows a user to specify which account the executing broker should place the trade into. TS Book, allows traders to specify TradeBook® and for order management and other purposes.

According to some embodiments of the GUI 400a, b, the Additional Fields region 484 may contain yet other field inputs depending on the type of order and venue on which the order is to be placed. Further, in other embodiments the Additional Fields region may appear on a floating window or another screen or in area separate from the rest of the GUI.

As mentioned, according to some embodiments the GUI 400a, b (FIGS. 4A, 4B) may be used to initiate trades. Associated with such trades are order parameters and trading functionality. For example, as discussed below, different trading modes may be provided, e.g., Speed Trading (e.g., without confirmation pop-ups) or Confirmation Trading (e.g., with one or more trading tickets or confirmation pop-ups). An embodiment of the GUI 400a, b may include a properties tab (not shown), which when selected will provide fields for election of Speed Trading On or Off, default order size, confirm Trading on or off, select Histogram (coloring) on or off, select Heat Colors on or off, customize heat colors, select "High, Low, Open" indicator on or off, and other fields.

According to some embodiments, refreshing (resetting) occurs in response to manual input that selects, e.g., the last price 422a, b, or initiation of a trade, which may result in movement of the price column as described below, and illustrated in the sequence of FIGS. 5A, 5B and 5C. In other embodiments, refreshing or resetting may occur automatically by computer action in response to a price change or the occurrence of an external event, etc. In some embodiments, refreshing or resetting may occur in response to manual input and automatically.

Default settings may allow a floating Tradebook® ticket from TradeBook® to appear to execute trades when a trader clicks on a bid or offer price. In other embodiments, an execution function may run on another screen in TradeBook® in order to execute a particular trade.

In some embodiments, a trader's working orders, or orders that have been placed but not yet executed, may be made to appear more visible or distinguishable. For example, any one of the price, volume, or other information of certain price may be highlighted in a color, such as blue, to indicate to the trader that the order is lying in queue waiting to be executed.

The GUI 400a, b (FIGS. 4A, 4B) may provide for user selection of, e.g., size, shape, zoom and orientation of the GUI. For example, an option may be provided to orient the GUI with the price region (and associated features) extending horizontally. This may be implemented in a drop-down box or a pull-down menu mouse drag, etc.

According to some embodiments, the GUI 400a, b may include regions for initiating a trade. In the embodiment illustrated in FIGS. 4A and B, a buy button 465 and a sell button 466 are provided aligned with each price. Selection of a buy or sell button, e.g., by a mouse click, initiates a trade of the item at the price aligned with the selected button (or a better price if available, in known fashion) in the size indicated in the region 482. Trade initiation may proceed in the Speed Trading mode or the Confirmation mode, depending upon the trading mode selected, e.g., via the properties tab referred to above. In the Speed Trading mode, a trade is initiated simply by selecting a buy or sell button aligned with a desired price. If a contra is found for a trade initiated in the Speed Trading mode, execution may occur with or without a confirmation screen.

In the Confirmation mode, one or more pop-up confirmation or trade ticket screens are provided that require entry or conformation of order information before an order can be either routed for matching or execution, or executed after being matched with a counterparty order. Such trade initiation, order routing, confirmation and trade execution functions are well know in the trading arts.

In other embodiments, the GUI 400a, b may include regions for initiating a trade by a left mouse click, a right mouse click, or a combination click, as opposed to a dedicated buy button 465 or a dedicated sell button 466. Each of the left mouse click, right mouse click, or combination click may be assigned to initiate a buy or sell of an item, such as the item at the price aligned with the click area (or a better price if available, in known fashion). As above, trade initiation may proceed in the Speed Trading mode or the Confirmation mode, depending upon the trading mode selected, e.g., via the properties tab referred to above. For example, in the Speed Trading mode, a trade is initiated simply by left, right, or combination clicking a desired price, or area adjacent to a desired price. If a contra is found for a trade initiated in the Speed Trading mode, execution may occur with or without a confirmation screen.

Alternatively, in some embodiments, trade initiation is begun by first selecting a price for a bid or offer. After selection of a desired price through the GUI 400a, b (FIG. 4A, 4B), a user then indicates the order type, i.e., a buy or sell order, for example, whether the price is a bid or offer. This indication of order type could be accomplished through a pop-up confirmation or trade ticket as previously discussed. Alternatively, after selection of a price, a buy or sell order may be initiated by selection of a buy or sell button on the GUI 400a, b. The buy or sell button does not necessarily have to be the buy or sell button that is aligned or associated with the selected price on the GUI 400a, b. Selection of a buy or sell button causes either a buy or sell order to be routed directly to a venue or the market, or otherwise initiates a trade.

Furthermore, it is possible that under certain market conditions that the dynamic display of quantities on the GUI may fluctuate very quickly and it may be difficult for an individual to correctly select a trade. To facilitate proper selections, the GUI 400a, b may have additional functionality for allowing a trader to slow or temporarily freeze the movement of quantities on the GUI. The slowing of changing displayed market information on the GUI maybe accomplished in several ways. In one embodiment, the GUI display of quantities may only be updated at certain time spaced intervals. Such intervals may be altered or controlled by the user. Alternatively, when the computer 182 receives market information it buffers the information, and then updates the GUIs 400a, b with the buffered values. Similarly, GUI 400a, b may be refreshed or reset according to user-specified/controlled times that may be slower than the time the computer 182 could provide display data without any interference from the user based solely on price changes. As mentioned, refreshing or resetting may be responsive to user input and not automatic action. In one embodiment, a user may enter input that causes the workstation 144 or the computer 182 to stop or delay updating, e.g., to freeze displayed information. This freeze may last for a specified period of time, or until the user indicates with input that the updating of prices should resume. During a freeze, a user can still easily initiate an order at a desired price.

Figure 5D:
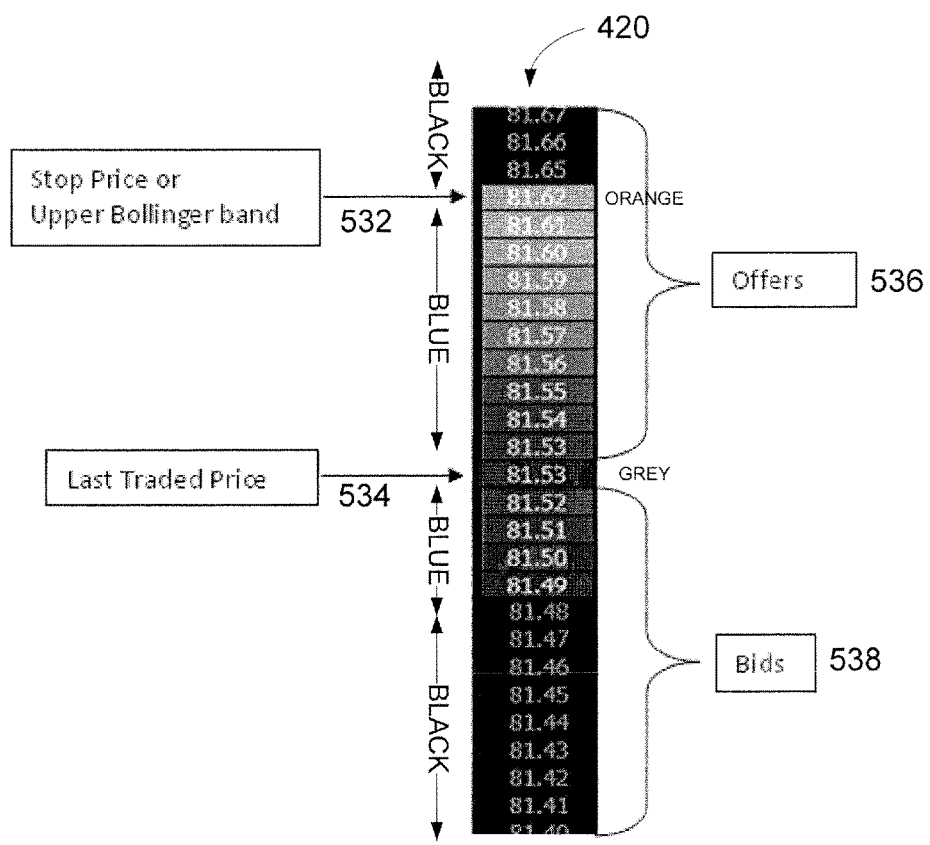
FIGS. 5D and 5E depict an illustration of a portion of the graphical user interface depicted in FIG. 4A according to another embodiment, in which the price region of the interface may reflect the market's movements toward or away from a reference such as a technical indicator, and at a second time after the interface was updated in FIG. 5E (for example, when the market has moved to a more expensive position and closer to the reference).

FIG. 5D illustrates another embodiment of price region 420 as the information presented by the GUI 400a is updated to reflect newly received market information, with the price region 420 configured to reflect the market's movements toward or away from a reference value, or values, or range, e.g., a technical indicator such as a stop price, or other static value or range, or a dynamic value or range, serving as a reference value or benchmark, as discussed in more detail below in connection with a stop price. (For clarity, FIG. 5D includes only the price region 420, and not other elements of the GUI 400a depicted in FIG. 4A.)

Embodiments of GUI 400a, b may include, as additional fields, input boxes for a trader to specify the reference value, or information used to derive the reference value, with price region 420 configured to reflect the market's movements toward or away from the reference value.

In an embodiment, the heat/color intensity of price region 420 continuously reflects the market's movements toward or away from a reference value, e.g., toward or away stop price 532. In an embodiment, a static value 532 is set as a trigger price (for example, 81.62 in price region 420) of, for example, a stop-loss order. The value 532 may be indicated by a color or colors in one color family, e.g., orange, while the last traded price 534 may be indicated by a color or colors in another color family, e.g., grey.

Current prices within a predetermined range of the reference value 532 (for example, prices 81.61 to 81.49, except for last traded price 81.53, in FIG. 5D) may be indicated by colors in another color family, e.g., blue, with the particular color or shade becoming less intense (e.g., becoming lighter) for prices closer to the value. Current prices outside a predetermined range of the value 532 (for example, prices 81.65 to 81.67 and 81.48 to 81.41 in FIG. 5D) may be indicated by colors in another color family, e.g., black, with no or little change in the heat/color intensity, and may be indicated with a font color family different from prices inside the predetermined range of the reference value 532, e.g., white fonts for prices inside the range, and blue and red fonts for offer and bid prices outside the range, respectively. As mentioned, the background color(s) for prices within each market color family may be selected, but need not be, in accordance with local, country, or market conventions and/or customs. Depending upon background color, font color(s) may also be selected, but need not be, in accordance with local, country, or market conventions and/or customs, e.g., green or blue for offers and red for bids. The heat/color intensity of price region 420 may therefore serve as an updatable indicator alerting the trader that a current price is inside or outside a predetermined range of the reference value, e.g., a stop price 532.

In another embodiment, as opposed to the static value discussed above, a reference value may comprise a dynamic value 532, such as an upper or lower Bollinger band level, or a Relative Strength Index (RSI) indicator. In an embodiment, the heat/color intensity of price region 420 continuously reflects the market's movements toward or away from the dynamic value, e.g., toward or away Bollinger Band 532.

According to some embodiments, refreshing (resetting) of FIG. 5D occurs in response to manual input that selects, e.g., the last price 422a, b, or initiation of a trade, which may result in movement of the price column. In other embodiments, refreshing or resetting may occur automatically by computer action in response to a price change or the occurrence of an external event, or a recalculation or reset of a dynamic reference value, e.g., dynamic value 532 such as an upper or lower Bollinger band level or a Relative Strength Index (RSI) indicator.

Figure 5E:
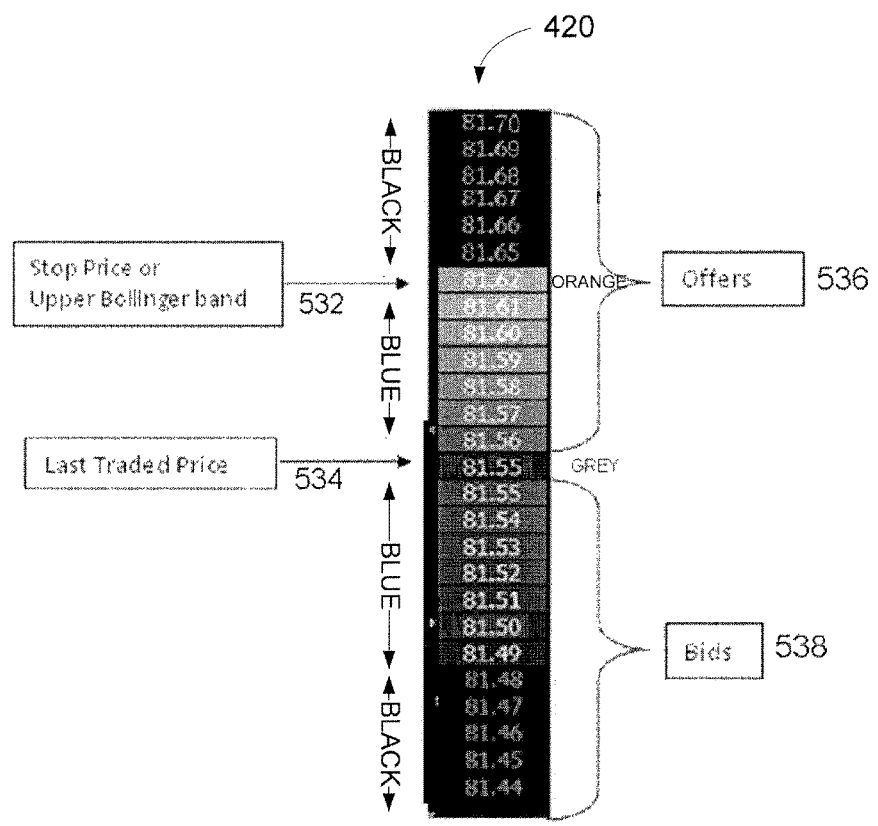

For example, FIG. 5E depicts an illustration wherein the price region of the interface reflects the market's movements toward or away from a reference value as shown in FIG. 5D, but at a second time after the interface was updated in FIG. 5E, e.g., where the market has moved to a more expensive position and closer to a reference value, e.g., the static or dynamic value 532. In the embodiment depicted in FIG. 5E, the last traded price 534 remains centered and in gray, with the last traded price reflecting a value of 81.55, i.e., an upward price movement from the previous last traded price depicted in FIG. 5D, 81.53. The static or dynamic reference value 532 continues to reflect a value of 81.62 in orange and has moved in position relative to the last traded price 534, depicting that the reference value 532, i.e., a stop price or Upper Bollinger Band, is now closer to the last traded price, providing valuable feedback to a trader. Current prices within a predetermined range of the value 532 (for example, prices 81.61 to 81.49, except for last traded price 81.55) continue to be indicated by colors in another color family, e.g., blue, with the particular color or shade becoming less intense (e.g., becoming lighter) for prices closer to the value 532.

Figure 6A:
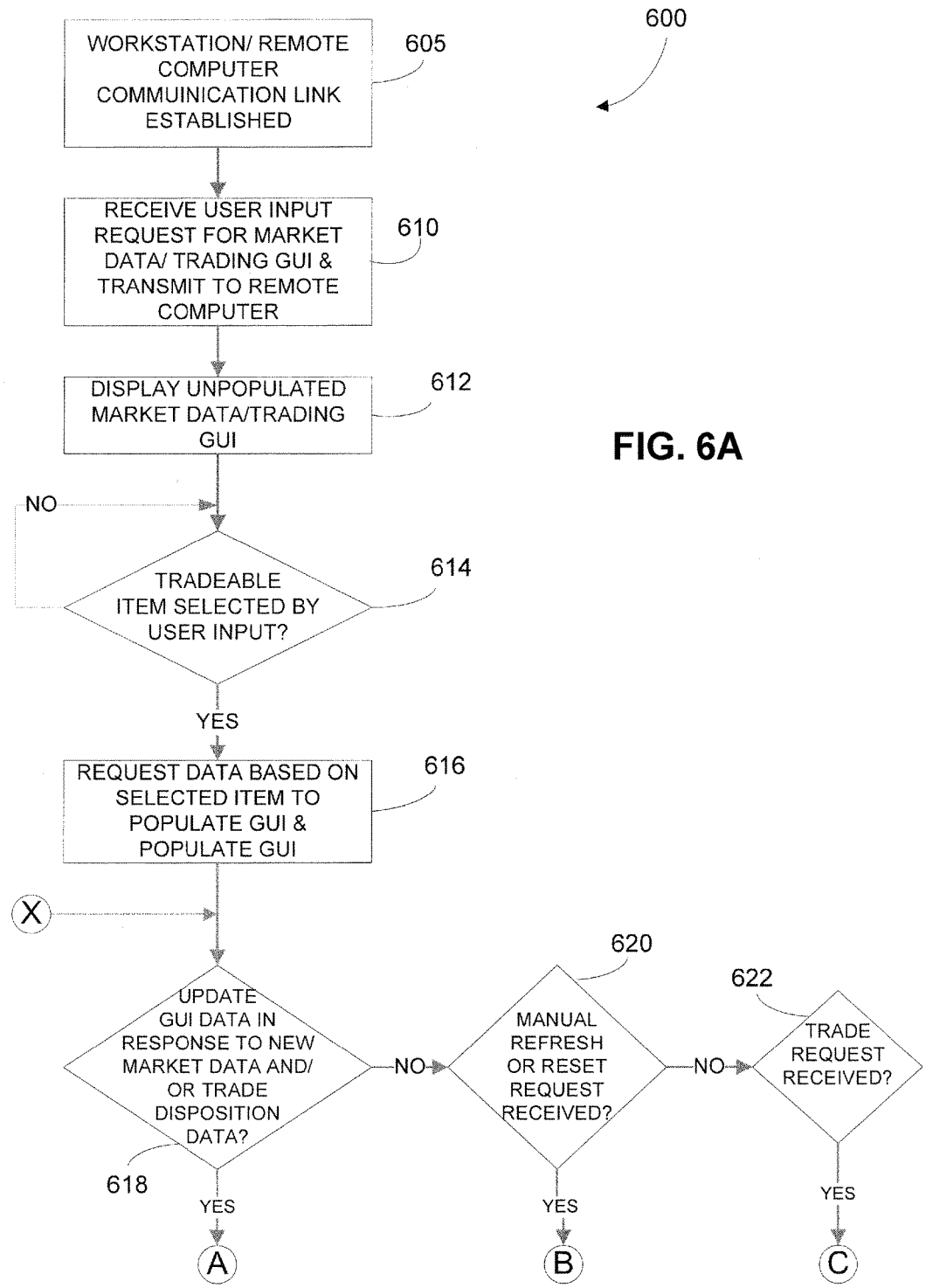
FIGS. 6A and 6B depict a flow illustrating operation at a trader workstation according to an embodiment of the invention of the graphical user interface illustrated in FIGS. 4A, 5A, 5B and 5C.
Figure 6B:
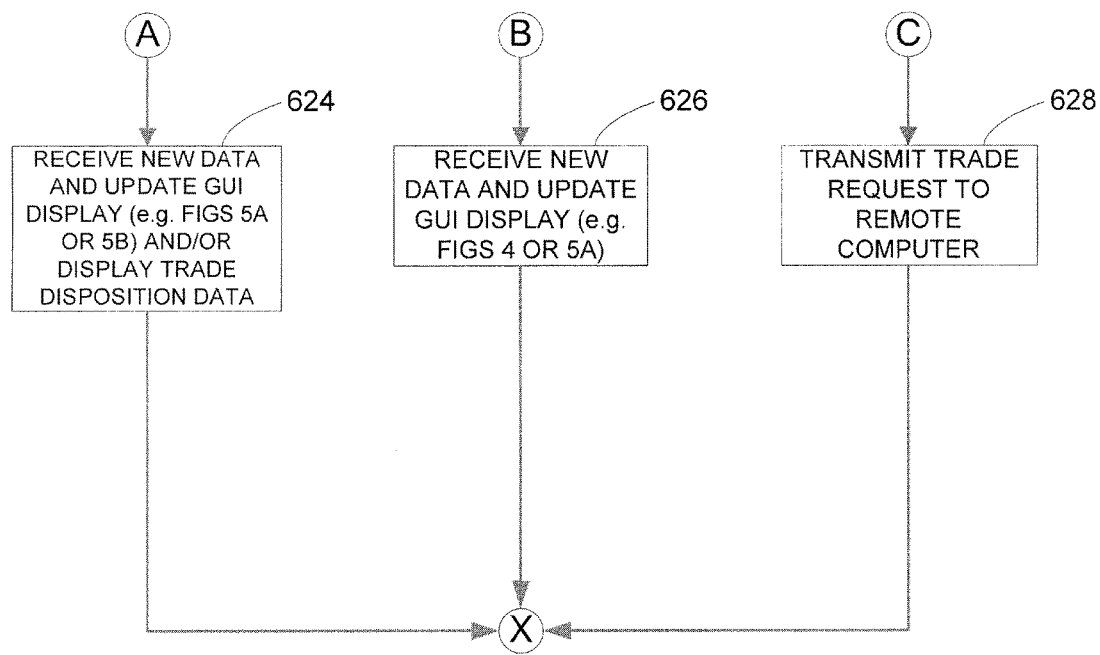

FIGS. 6A and 6B depict an exemplary process flow 600 by which a workstation 144 (FIG. 3) displays a GUI such as GUI 400a (FIG. 4A) and interacts with a remote computer 182 and user input. In block 605, communication between a trader workstation 144 and a remote computer 182 is established. This may involve a log on procedure, etc. After the user workstation receives a user input request in block 610 to run the market data/trading GUI and transmits it to the remote computer 182, in block 612, the workstation displays the GUI without item market data, i.e., unpopulated, based on display data received from the remote computer. An unpopulated GUI display may include blank cells for the last, best offer, best bid and market depth prices and prices. Additionally, the cells may be colored uniformly in, e.g., a neutral color or white. The unpopulated GUI includes the buy and sell buttons, and other buttons and selectable regions. However, these buttons and regions may be muted to indicate that they are not active and cannot be selected.

Figure 8A:
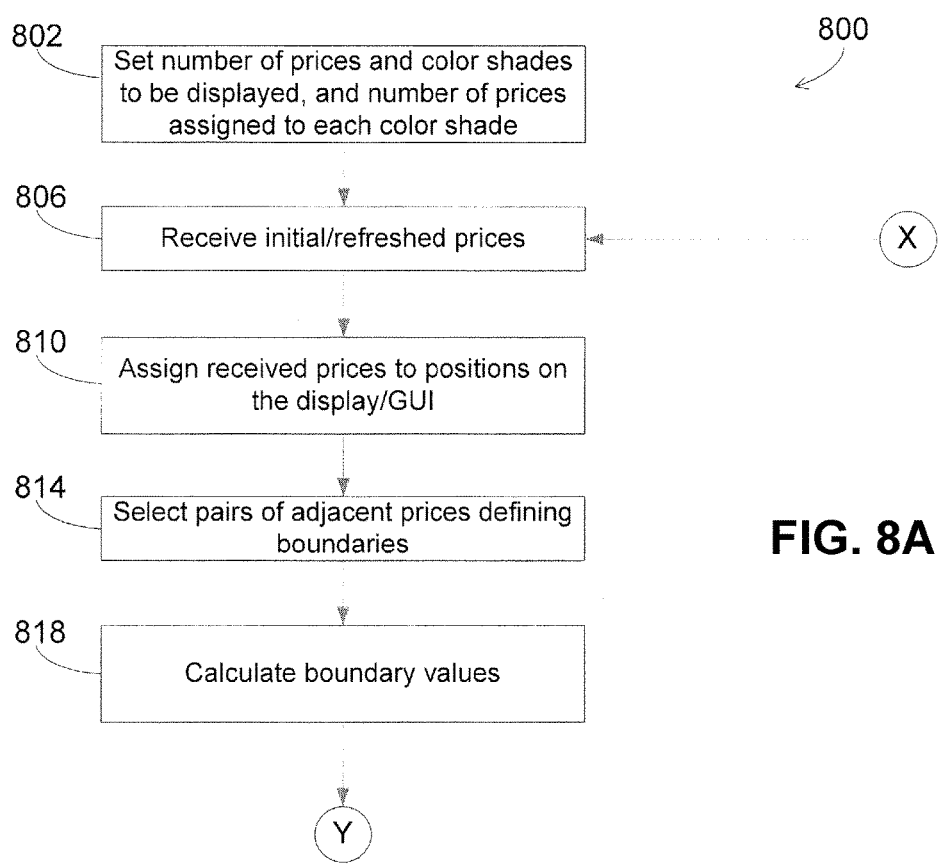
FIGS. 8A and 8B depict a flow illustrating assignment of colors to price cells in the GUI of FIGS. 4-5.
Figure 8B:
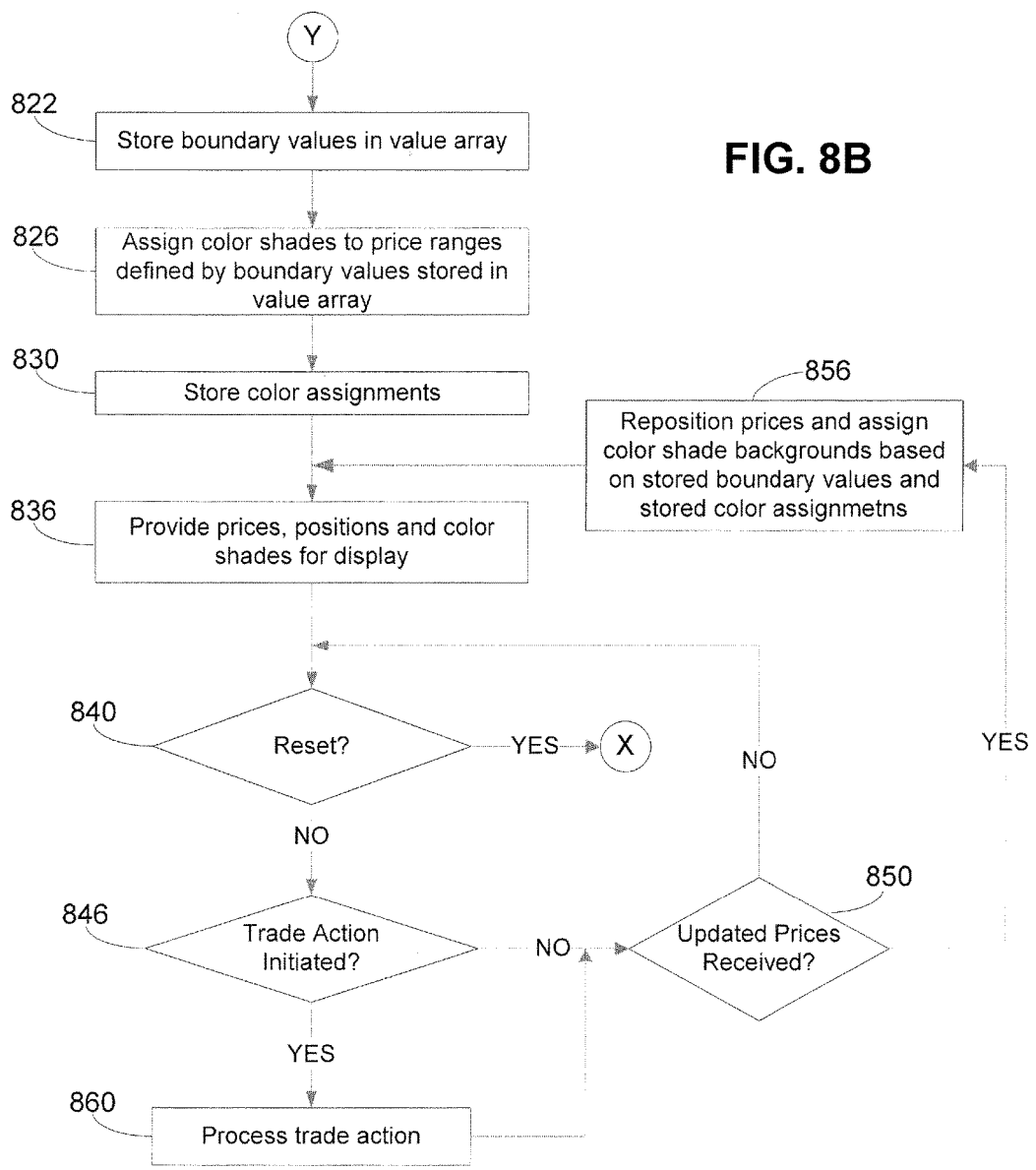

In block 614, the GUI 400 waits for user input to select a tradable item, which can be input as described above. When such input is received, the flow proceeds to block 616, where the workstation requests data from the remote computer 182 to populate the GUI 400a based on the selected tradable item. The workstation then populates the GUI with market data and background color indications, as illustrated for example in FIG. 4A. Color is assigned to the various cells of the GUI display by a computer 182 based on the last price, best offer, best bid and market depth, according to a routine run by a processor 110. A process for assigning color to price cells is described below in connection with FIGS. 8A and 8B. Volatile memory 190 stores values representing the data displayed be each GUI 400a displayed at a trader workstation. Since the remote computer stores current GUI displays, it can determine whether to simply update a value or values or provide a new display.

The GUI 400a then waits for input from the remote computer or the user. In block 618, the GUI 400 determines whether there is new market data available for updating the displayed GUI. If there is, flow proceeds to block 624, where new data is received and the GUI updated automatically, as illustrated in FIG. 5B or 5C, and flow loops back to block 618. Some embodiments may not provide for automatic updating so that flow would proceed from block 616 to block 620. The GUI performs a check in block 620 for user input requesting a refresh or reset. If a refresh or reset request was received by the GUI, e.g., by user selection of the last price as discussed above, flow proceeds to block 626 where the workstation receives new data and updates the GUI display, which appears as shown in FIG. 4A or 5A where the GUI display is re-centered, as described above. Process flow then loops back to block 618. The GUI performs another check in block 622 to determine whether the GUI received a trade request, i.e., whether user input selected a buy or sell region aligned with a price. If so, process flow proceeds to block 628 where the trade request is transmitted to the remote computer 182. Process flow then loops back to block 628 and the GUI awaits new information including trade disposition information in block 628, which may be provided in a separate window or by a pop-up, etc.

After selection of a new tradable item, the workstation receives new market information related to the new item, including color information as described above.

Figure 7A:
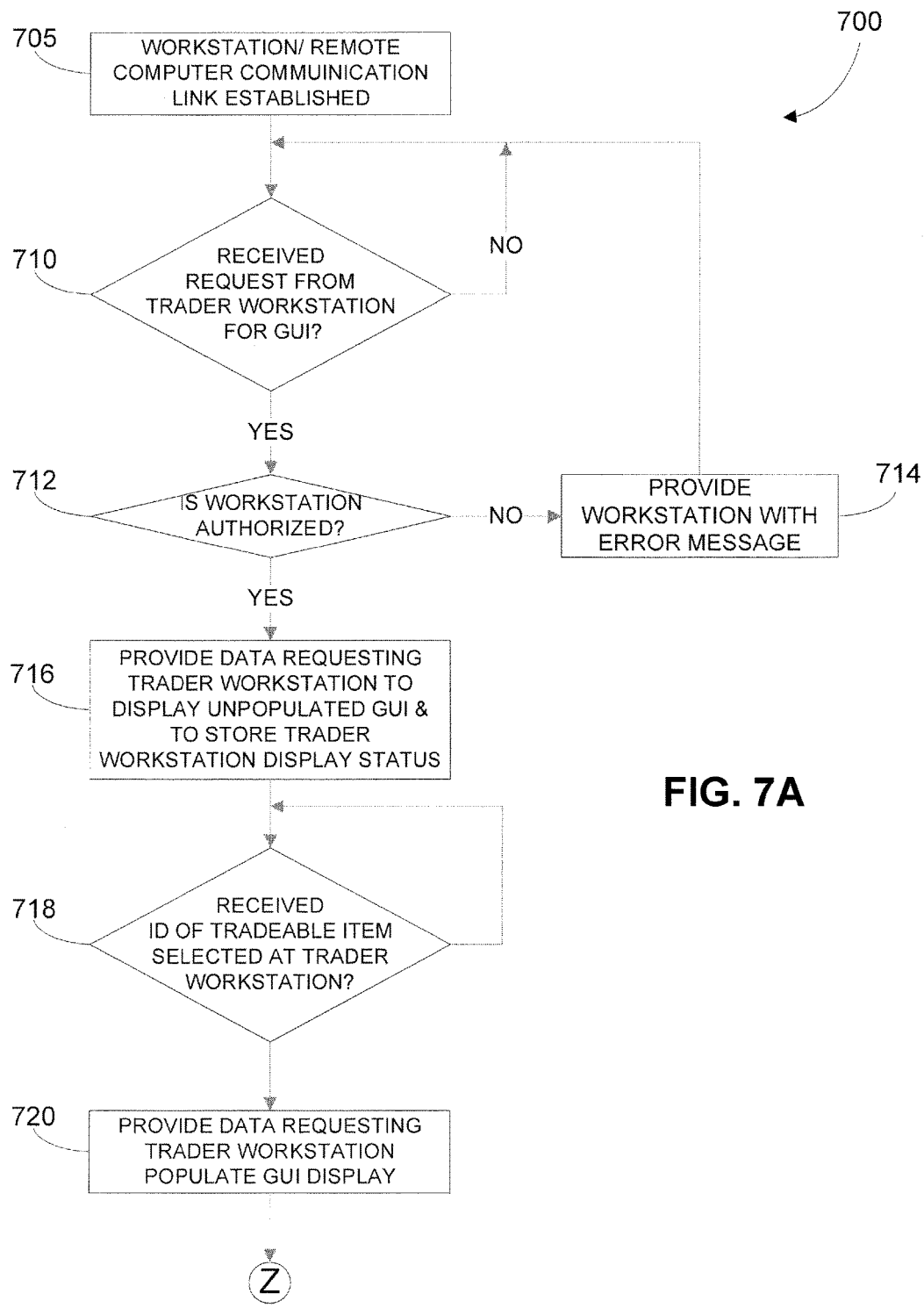
FIGS. 7A and 7B depict a flow illustrating operation at a remote computer according to an embodiment of the invention of the graphical user interface illustrated in FIGS. 4A, 5A, 5B and 5C.
Figure 7B:
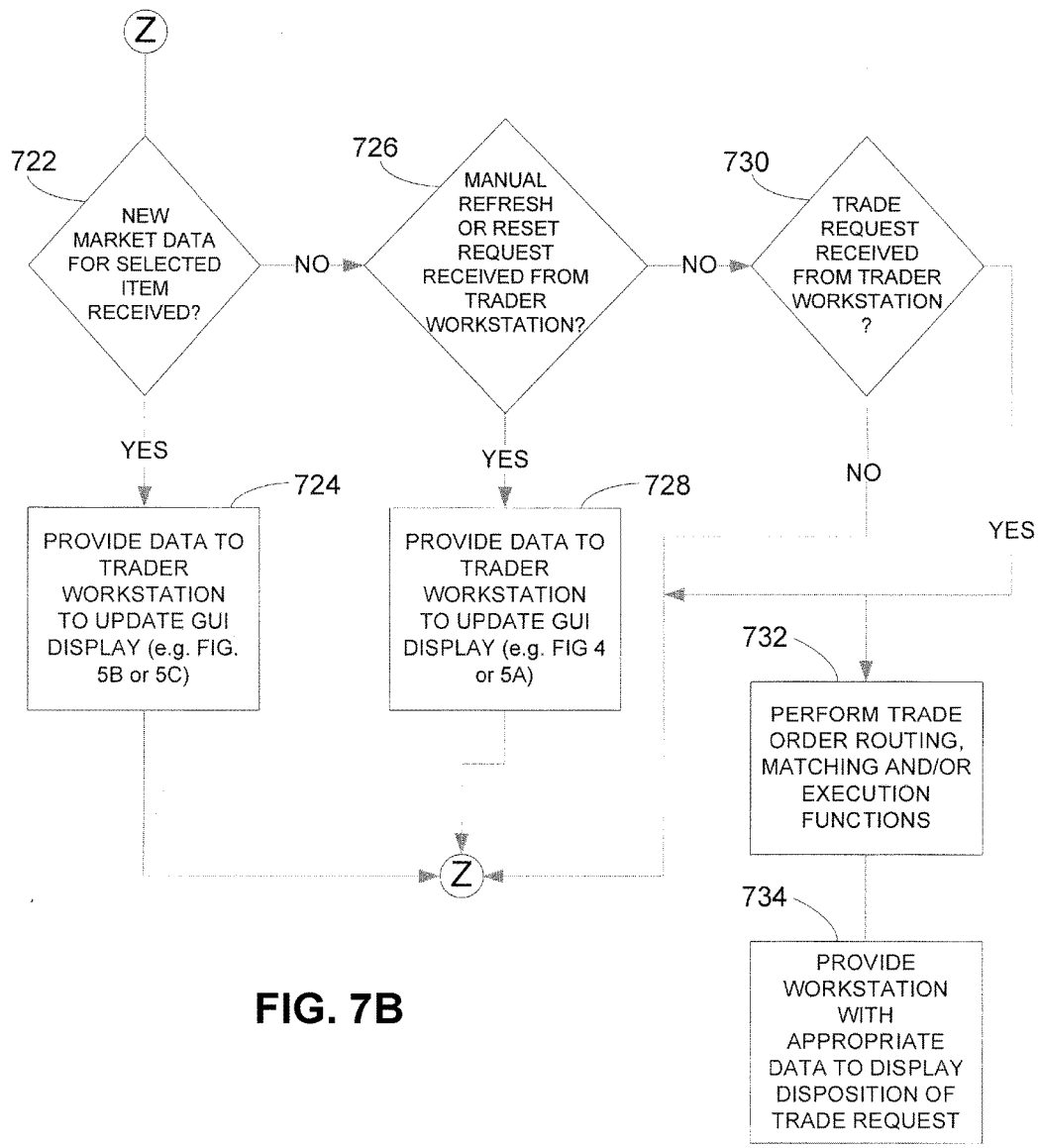

FIGS. 7A and 7B depict an exemplary process flow 700 by which a remote computer 182 (FIG. 3) interacts with a workstation 144 to display and update GUI 400a and process trade requests. In block 705, a link is established between a workstation and the remote computer, e.g., pursuant to a log-in procedure in block 710, the remote computer in block 712 determines whether a request for GUI 400a has been received. If a request is received, in block 710, remote computer 182 determines whether the workstation is authorized to run the GUI 400a application. If the workstation is not authorized, the remote computer 182 in block 714 provides an error message for the workstation, and if the work station is authorized, process flow proceeds to block 716. In block 716, the remote computer provides data to the requesting workstation to run the GUI 400a and display it unpopulated. (An unpopulated GUI display is discussed above.)

In block 718, the remote computer 182 determines whether a tradable item was selected at and transmitted by the workstation. In not, process flow loops in block 718, and if so, in block 720, the remote computer provides data to the requesting workstation for populating the GUI with market data and color indications, as illustrated for example in FIG. 4A. An exemplary algorithm for assigning color to price cells is described below.

Remote computer 182 assigns color to various cells of the GUI display according to a protocol, e.g., stored in database 192 or other non-volatile memory. One exemplary protocol assigns colors as described above in connection with FIG. 4A and FIGS. 5A-C, in accordance with an exemplary algorithm described below in connection with FIGS. 8A and 8B. Other suitable algorithms will be known to those of skill in the art. According to this protocol, white is associated with the cells displaying the best offer and bid, gray with the cell displaying the last price, and discrete colors in the green and red families are associated with the depth of market price cells. A discrete color may be associated with each market depth price cell, or a discrete color may be associated with two or more adjacent market depth price cells, as discussed above. The colors associated with the market depth prices may be stored in memory 122, or the colors may be associated with the market depth prices by an algorithm in messages transmitting the prices to the requesting workstation. For example, the colors may be sequentially stored and the algorithm may sequentially associate a color with the next price read from memory. At this point in the flow, the workstation displays a populated GUI 400a.

The remote computer then determines whether a request has been received form the workstation and whether the remote computer has received updated market data for the GUI display. In block 722, the remote computer determines whether there is new market data available for updating the displayed GUI. If there is, flow proceeds to 724 in which the updated market information is provided to the workstation and the flow then loops to block 722. As discussed above, based on the received new data, the workstation updates the GUI display, for example, as illustrated in FIG. 5B or 5C. If block 722 determines that new market data has not been received, or if the embodiment does not provide for automatic updating, remote computer 182 determines in block 726 whether the remote computer has received a manual refresh or reset request from the workstation. If user input of a refresh or reset request was received by the remote computer, flow proceeds to block 728 where the remote computer provides new data to the workstation to update the GUI display, for example, as shown in FIG. 4A or 5A where the GUI display is re-centered, as described above. Process flow then loops back to block 722. Color data is provided to the workstation in blocks 724 and 728, e.g., as discussed below in connection with FIGS. 8A and 8B.

In block 730, the remote computer determines whether it has received a trade request, i.e., whether the trader workstation has received user input selecting a buy or sell region aligned with a price. If so, process flow loops back to block 722 and also proceeds to block 732, where the remote computer performs trade order routing, matching and/or execution functions. Such functions are well known in the art and therefore are not described herein. In block 734, the remote computer provides appropriate data regarding disposition of the trade request, which may be displayed as a pop-up in GUI 400a or in another window. If block 730 determines that a trade request has not been received, process flow then loops back to block 722.

One algorithm for assigning colors to price cells operates as follows (other algorithms which can be constructed based on this disclosure will be apparent to those of skill in the art.). The algorithm determines an array of boundary values from either an initial or refreshed set of prices. The boundary values define multiple price ranges, to each of which are assigned a particular color shade (or gradation) in a color family. Each boundary value is calculated as the average or mean of a set of two adjacent prices defining the boundary. The algorithm may select which pairs of adjacent prices are to be used to calculate boundary values based on factors such as the size of the price region of the display/GUI (i.e. the total number of prices displayed in the price region) and the number of shades to be used. The algorithm then assigns a different color shade to each price on a side a boundary, to a price or prices that fall within the price ranges defined by one or more the boundary values, and stores this. As prices change, the algorithm assigns colors to new prices in accordance with the stored boundary values and previously assigned colors to the prices falling within boundary values. The algorithm this "sticks" previously assigned colors to new prices based on the boundary values.

FIG. 8 depicts a flow illustrating an embodiment of a color assigning algorithm 800. Variables in the algorithm, including at least the following, are preferably preset, as represented by block 802: the number of prices to be displayed in the price region of the display/GUI (e.g., to 10 offer and 10 bid prices), the number of color shades (e.g., to four) and the number of prices assigned to each color shade. Market prices are received in block 806, and the algorithm determines in block 810 the positions in the display/GUI of various pries, as discussed above. In block 814, the algorithm determines the pairs of adjacent prices which define the boundaries. The selected set of adjacent prices may be spaced evenly apart according to a mathematical or aesthetic relationship, or a predetermined span of prices. For example, for a display/GUI displaying 10 offer and 10 bid prices, four boundaries for offer prices and four boundaries for bid prices, the boundaries spaced one or two prices apart. In block 818, the boundary values are calculated, e.g., as mean or average, or any other appropriate mathematical relationship, of each adjacent price value defining the boundary.

In block 822, the boundary values are stored as an array. Color shades are then assigned to the price ranges defined by the array of boundary values in block 826 and stored in association with the price ranges in block 830. For example, prices greater than or equal to a first boundary value but less than the second boundary value may be assigned a first color shade (e.g., a lighter color shade). Prices greater than or equal to the second boundary value but less than a third value will then be assigned a slightly darker shade than the first assigned color. This color assigning process continues until the last boundary value defines one color/shade for all prices greater than or equal to last boundary value for the offer and bid prices. In block 836, the prices, positions and color assignments are provided to the display/GUI, which displays the prices as discussed above with the assigned background color shades.

The display/GUI continues to display the prices as positioned with the color backgrounds as assigned. In block 840, the algorithm determines whether a reset was input. If a reset has occurred, the process loops to block 806 and price positioning and color shade assignments are determined anew. If a reset has not occurred, the process proceeds to block 846 to determine if a trade action has been initiated. If not, the algorithm determines in block 850 if there has been a price update and whether the display/GUI has to be updated. If so, in block 856, the algorithm repositions prices and assigns color shade backgrounds based on stored boundary values and stored color shade assignments. As pointed out above, some embodiments may not include automatic updating so that flow would proceed from block 846 to block 856. If in block 846 it is determined that a trade action was initiated, the trade action is processed in block 860, and then the algorithm determines whether there has been a price update in block 850. The process loops in determining whether a reset has occurred, or a trade action was initiated or whether there has been a price update.

After a price update, previously assigned color shades "stick" to the repositioned prices that fall within the price ranges defined by the boundary values. As the display/GUI changes with changing prices, new prices values may be added that fall within previously determined price ranges and therefore will be assigned the color shade assigned to particular price range. Thus, prices can be inserted and deleted while maintaining visual persistence with respect to price ranges and background color shades and also providing an easily perceived visual indication to the viewer of market change and direction from the first time to a second time by movement of color.

While the invention has been described and illustrated in connection with certain embodiments, many variations and modifications as will be evident to those skilled in this art may be made without departing from the spirit and scope of the invention, and the invention is thus not to be limited to the precise details of methodology or construction set forth above as such variations and modifications are intended to be included within the scope of the invention as may be defined by claims.

We claim:

1. A method of presenting on an electronic display device information relating to bids and offers of an item traded on at least one venue, the display device being controlled by at least one computer which receives at least offer and bid prices at a first time and at a second time, the method comprising:

(a) displaying, at the first time, on the display device
a first plurality of offer prices comprising a best offer price and at least one offer price worse than the best offer price;
a first plurality of bid prices comprising a best bid price and at least one bid price worse than the best bid price; and
a visual indicator comprising a color part and a position part which at least facilitates distinguishing offer prices and bid prices, wherein a background color of the visual indicator varies in intensity in proportion to a relative difference in offer prices and bid prices, and wherein the intensity of the background color is based on proximity of an offer price to the best offer price and proximity of a bid price to the best bid price, the best offer price associated with the first plurality of offer prices is indicated by a first color in the visual indicator, and the best bid price associated with the first plurality of bid prices is indicated by a second color, the first color and the second color being different;
wherein the offer prices and the bid prices are displayed according to an alignment with (i) the offer prices on an offer side and the bid prices on a bid side as distinguished by at least a first part of the visual indicator which is in a first position in the alignment, (ii) the best offer price closer to the first position than the at least one worse offer price and (iii) the best bid price closer to the first position than the at least one worse bid price;
(b) displaying, at the second time, when at least the best offer price and/or the best bid price received by the at least one computer is different from at least the best offer price and/or the best bid price displayed on the display device at the first time, on the display device at least:
a second plurality of offer prices comprising a best offer price and at least one offer price worse than the best offer price;
a second plurality of bid prices comprising a best bid price and at least one bid price worse than the best bid price; and
the visual indicator; and
producing a persistence, from the displaying of and associated with the visual indicator, of at least a part of a first presentation of the information on the electronic display device at the first time in a second presentation of the information on the electronic display device at the second time, the second time being later than the first time and having a shift in positions in an orientation or alignment of one more of the offer prices and the bid prices, the persistence produced by at least:
maintaining, from the first time to the second time, the first color of the best offer price associated with the first plurality of offer prices, and maintaining the second color of the best bid price associated with the first plurality of bid prices, regardless of whether the best offer price and/or the best bid price received, at the second time, is different from the best offer price and/or the best bid price displayed at the first time, such that the offer and bid prices at the second time are displayed according to the alignment at the first time with (i) the first visual indicator part in the first position in the alignment and at least a second part of the visual indicator in a position in the alignment at the second time different from the first position at the second time and (ii) the different positions of the first and second parts of the visual indicator at the second time indicate a change in at least one displayed price from the first time to the second time.

2. The method of claim 1, wherein the method further comprises displaying a heat mapping produced from a selection of the first color and the second color for expressing a degree to which an individual market depth price differs from the best bid price.

3. The method of claim 1, wherein the first plurality of offer prices plus the first plurality of bid prices at the first time are equal in number, and the second plurality of offer prices plus the second plurality of bid prices at the second time are equal in number and equal to the number at the first time.

4. The method of claim 2, wherein the the method further comprises displaying each of the plurality of bid and offer prices at the first time and at the second time over at least one background.

5. The method of claim 4, wherein the visual indicator comprises the best bid price and the best offer price being displayed, at the first time, midway in the alignment over the same background which is different from a background displayed for any other price and, at the second time, spaced from midway over the same background as at the first time.

6. The method of claim 5, wherein the background for at least two of the plurality of worse offer prices is different but similar at the first and second times, and the background for at least two of the plurality of worse bid prices is different but similar at the first and second times, and wherein an intensity of the backgrounds increases for a worse price or prices compared to a better price or prices.

7. The method of claim 4, wherein the background for at least two of the plurality of worse offer prices is different but similar at the first and second times, and the background for at least two of the plurality of worse bid prices is different but similar at the first and second times, and wherein an intensity of the backgrounds increases for a price or prices relative to at least one reference value.

8. The method of claim 7, wherein the reference value comprises a static value.

9. The method of claim 7, wherein the reference value comprises a dynamic value.

10. The method of claim 8, wherein the static value comprises one or more of a price, trigger price, and stop price.

11. The method of claim 9, wherein the dynamic value comprises one or more of a Relative Strength Index, Money Flow Index, Stochastics, MACD, and Bollinger Band value.

12. The method of claim 1, wherein the method further comprises displaying a graphic image in or adjacent to the alignment between the best offer price and the best bid price at the first and second times, and wherein the first part of the visual indicator comprises the graphic image.

13. The method of claim 12, wherein the graphic image comprises a line extending between the best offer price and the best bid price at the first and second times.

14. The method of claim 1, wherein the at least one computer receives a last price at the first and second times, and wherein the method further comprises displaying the last price midway in the alignment and midway between the respective plurality of bid prices and the respective plurality of offer prices at the first and second times.

15. The method of claim 1, wherein the first visual indicator part is a center of the alignment.

16. The method of claim 5, wherein the method further comprises displaying a background for the at least one worse offer price that is different from a background for the at least one worse bid price at the first and second times, wherein the background for the at least one worse offer price at the first time and the at least one worse offer price at the second time is either the same or similar, and wherein the background for the at least one worse bid price at the first time and the at least one worse bid price at the second time is either the same or similar, but different from the background or backgrounds for the at least one worse offer price at the first and second times.

17. The method of claim 1, wherein the first plurality of offer prices comprises a plurality of offer prices worse than the best offer price and the first plurality of bid prices comprises a plurality of bid prices worse than the best bid price; and wherein the second plurality of offer prices comprises a plurality of offer prices worse than the best offer price and the second plurality of bid prices comprises a plurality of bid prices worse than the best bid price.

18. A method of presenting on an electronic display device information relating to bids and offers of an item traded on at least one venue, the display device being controlled by at least one computer which receives at least offer and bid prices at a first time and at a second time, the method comprising:
(a) displaying, at the first time, on the display device at least:
a first plurality of offer prices comprising a best offer price and a plurality of offer prices worse than the best offer price, each of the worse offer prices being displayed over a background which is similar for each with an intensity of the background increasing for a worse price or prices compared to a better price or prices;
a first plurality of bid prices comprising a best bid price and a plurality of bid prices worse than the best bid price, each of the worse bid prices being displayed over a background which is similar for each but different from the background for any of the worse offer prices and with an intensity of the background increasing for a worse price or prices compared to a better price or prices; and
a visual indicator comprising a color part and a position part which at least facilitates distinguishing offer prices and bid prices, wherein a background color of the visual indicator varies in intensity in proportion to a relative difference in offer prices and bid prices, and wherein the intensity of the background color is based on proximity of an offer price to the best offer price and proximity of a bid price to the best bid price, the best offer price associated with the first plurality of offer prices is indicated by a first color in the visual indicator, and the best bid price associated with the first plurality of bid prices is indicated by a second color, the first color and the second color being different;
wherein the offer prices and the bid prices are displayed according to an alignment with (i) the offer prices on an offer side and the bid prices on a bid side as distinguished by at least a first part of the visual indicator which is in a first position in the alignment, (ii) the best offer price closer to the first position than the plurality of worse offer prices, (iii) the best bid price closer to the first position than the plurality of worse bid prices and (iv) the first visual indicator part midway in the alignment between bid and offer prices;
(b) displaying, at the second time, when at least the best offer price and/or the best bid price received by the at least one computer is different from at least the best offer price and/or the best bid price displayed on the display device at the first time, on the display device at least:
a second plurality of offer prices comprising a best offer price and a plurality of prices worse than the best offer price, each of the worse offer prices being displayed over a background corresponding at least in part to the background or backgrounds for the respective prices displayed at the first time;
a second plurality of bid prices comprising a best bid price and a plurality of prices worse than the best bid price, each of the worse bid prices being displayed over a background corresponding at least in part to the background or backgrounds for the respective prices displayed at the first time; and
the visual indicator; and
producing a persistence, from the displaying of and associated with the visual indicator, of at least a part of a first presentation of the information on the electronic display device at the first time in a second presentation of the information on the electronic display device at the second time, the second time being later than the first time and having a shift in positions in an orientation or alignment of one more of the offer prices and the bid prices, the persistence provided by at least:
maintaining, from the first time to the second time, the first color of the best offer price associated with the first plurality of offer prices, and maintaining the second color of the best bid price associated with the first plurality of bid prices, regardless of whether the best offer price and/or the best bid price received, at the second time, is different from the best offer price and/or the best bid price displayed at the first time, such that the offer and bid prices at the second time are displayed according to the alignment at the first time with (i) the first visual indicator part in the first in the alignment and at least a second part of the visual indicator in a position in the alignment at the second time different from the first position at the second time and (ii) the different positions of the first and second parts of the visual indicator at the second time indicate a change in at least one displayed price from the first time to the second time.

19. The method of claim 18, wherein the first plurality of offer prices plus the first plurality of bid prices at the first time are equal in number, and the second plurality of offer prices plus the second plurality of bid prices at the second time are equal in number and equal to the number at the first time.

20. The method of claim 18, wherein the further comprises displaying a graphic image in or adjacent to the alignment between the best offer price and the best bid price at the first and second times, and wherein the first part of the visual indicator comprises the graphic image.

21. The method of claim 20, wherein the graphic image comprises a line extending between the best offer price and the best bid price at the first and second times, and the method further comprises displaying a heat mapping produced from a selection of the first color and the second color for expressing a degree to which an individual market depth price differs from the best bid price.

22. The method of claim 18, wherein the at least one computer receives a last price at the first and second times, and wherein the at least one computer causes the display to display the last price midway in the alignment and midway between the respective plurality of bid prices and the respective plurality of offer prices at the first and second times.

23. A system for presenting on an electronic display device information relating to bids and offers of an item traded on at least one venue, the system comprising:
at least one computer which receives at least offer and bid prices at a first time and at a second time; and
a computer readable medium or medium on which is stored computer code that causes the at least one computer to at least:
(a) at the first time displaying on the display device at least:
a first plurality of offer prices comprising a best offer price and at least one offer price worse than the best offer price;
a first plurality of bid prices comprising a best bid price and at least one bid price worse than the best bid price; and
a visual indicator comprising a color part and a position part which at least facilitates distinguishing offer prices and bid prices, wherein a background color of the visual indicator varies in intensity in proportion to a relative difference in offer prices and bid prices, and wherein the intensity of the background color is based on proximity of an offer price to the best offer price and proximity of a bid price to the best bid price, the best offer price associated with the first plurality of offer prices is indicated by a first color in the visual indicator, and the best bid price associated with the first plurality of bid prices is indicated by a second color, the first color and the second color being different;
wherein the offer prices and the bid prices are displayed according to an alignment with (i) the offer prices on an offer side and the bid prices on a bid side as distinguished by at least a first part of the visual indicator which is in a first position in the alignment, (ii) the best offer price closer to the first position than the at least one worse offer price and (iii) the best bid price closer to the first position than the at least one worse bid price;
(b) at the second time displaying on, when at least the best offer price and/or the best bid price received by the at least one computer is different from at least the best offer price and/or the best bid price displayed on the display device at the first time, the display device at least:
a second plurality of offer prices comprising a best offer price and at least one offer price worse than the best offer price;
a second plurality of bid prices comprising a best bid price and at least one bid price worse than the best bid price; and
the visual indicator; and
producing a persistence, from the displaying of and associated with the visual indicator, of at least a part of a first presentation of the information on the electronic display device at the first time in a second presentation of the information on the electronic display device at the second time, the second time being later than the first time and having a shift in positions in an orientation or alignment of one more of the offer prices and the bid prices, the persistence provided by at least:
maintaining, from the first time to the second time, the first color of the best offer price associated with the first plurality of offer prices, and maintaining the second color of the best bid price associated with the first plurality of bid prices, regardless of whether the best offer price and/or the best bid price received, at the second time, is different from the best offer price and/or the best bid price displayed at the first time, such that the offer and bid prices at the second time are displayed according to the alignment at the first time with (i) the first visual indicator part in the first position in the alignment and at least a second part of the visual indicator in a position in the alignment at the second time different from the first position at the second time and (ii) the different positions of the first and second parts of the visual indicator at the second time indicate a change in at least one displayed price from the first time to the second time.

24. A non-transitory computer readable medium or medium that stores thereon computer code that causes a system to perform a method of presenting on an electronic display device information relating to bids and offers of an item traded on at least one venue, the system comprising at least one computer which receives at least offer and bid prices at a first time and at a second time, the method comprising:

(a) at the first time, displaying on the display device at least:

a first plurality of offer prices comprising a best offer price and at least one offer price worse than the best offer price;

a first plurality of bid prices comprising a best bid price and at least one bid price worse than the best bid price; and a visual indicator comprising a color part and a position part which at least facilitates distinguishing offer prices and bid prices, wherein a background color of the visual indicator varies in intensity in proportion to a relative difference in offer prices and bid prices, and wherein the intensity of the background color is based on proximity of an offer price to the best offer price and proximity of a bid price to the best bid price, the best offer price associated with the first plurality of offer prices is indicated by a first color in the visual indicator, and the best bid price associated with the first plurality of bid prices is indicated by a second color, the first color and the second color being different;

wherein the offer prices and the bid prices are displayed according to an alignment with (i) the offer prices on an offer side and the bid prices on a bid side as distinguished by at least a first part of the visual indicator which is in a first position in the alignment, (ii) the best offer price closer to the first position than the at least one worse offer price and (iii) the best bid price closer to the first position than the at least one worse bid price;

(b) at the second time displaying on, when at least the best offer price and/or the best bid price received by the at least one computer is different from at least the best offer price and/or the best bid price displayed on the display device at the first time, the display device at least:

a second plurality of offer prices comprising a best offer price and at least one offer price worse than the best offer price;

a second plurality of bid prices comprising a best bid price and at least one bid price worse than the best bid price; and the visual indicator; and producing a persistence, from the displaying of and associated with the visual indicator, of at least a part of a first presentation of the information on the electronic display device at the first time in a second presentation of the information on the electronic display device at the second time, the persistence provided by at least maintaining, from the first time to the second time, the second time being later than the first time and having a shift in positions in an orientation or alignment of one more of the offer prices and the bid prices, the first color of the best offer price associated with the first plurality of offer prices, and maintaining the second color of the best bid price associated with the first plurality of bid prices, regardless of whether the best offer price and/or the best bid price received, at the second time, is different from the best offer price and/or the best bid price displayed at the first time, such that the offer and bid prices at the second time are displayed according to the alignment at the first time with (i) the first visual indicator part in the first position in the alignment and at least a second part of the visual indicator in a position in the alignment at the second time different from the first position at the second time and (ii) the different positions of the first and second parts of the visual indicator at the second time indicate a change in at least one displayed price from the first time to the second time.

* * * * *

UNITED STATES PATENT AND TRADEMARK OFFICE
CERTIFICATE OF CORRECTION

PATENT NO. : 10,185,989 B2
APPLICATION NO. : 13/020469
DATED : January 22, 2019
INVENTOR(S) : Matthew T. Ritter et al.

It is certified that error appears in the above-identified patent and that said Letters Patent is hereby corrected as shown below:

In the Claims

Claim 4, Column 29, Line 16-17, "The method of claim 2, wherein the the method further comprises displaying each of the plurality of bid and offer" should read -- The method of claim 2, wherein the method further comprises displaying each of the plurality of bid and offer --

Signed and Sealed this
Nineteenth Day of March, 2019

Andrei Iancu
*Director of the United States Patent and Trademark Office*